(12) United States Patent
Kim et al.

(10) Patent No.: US 9,313,000 B2
(45) Date of Patent: Apr. 12, 2016

(54) METHOD FOR TRANSCEIVING A REFERENCE SIGNAL IN A WIRELESS CONNECTION SYSTEM AND TERMINAL THEREFOR

(75) Inventors: Jinmin Kim, Anyang-si (KR); Seunghee Han, Anyang-si (KR); Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 14/126,785

(22) PCT Filed: Jul. 4, 2012

(86) PCT No.: PCT/KR2012/005306
§ 371 (c)(1),
(2), (4) Date: Dec. 16, 2013

(87) PCT Pub. No.: WO2013/005986
PCT Pub. Date: Jan. 10, 2013

(65) Prior Publication Data
US 2015/0249526 A1   Sep. 3, 2015

Related U.S. Application Data

(60) Provisional application No. 61/504,247, filed on Jul. 4, 2011.

(51) Int. Cl.
*H04L 5/00* (2006.01)
*H04L 27/26* (2006.01)
*H04J 13/18* (2011.01)

(52) U.S. Cl.
CPC .............. *H04L 5/0048* (2013.01); *H04J 13/18* (2013.01); *H04L 5/0051* (2013.01); *H04L 27/2613* (2013.01); *H04L 5/001* (2013.01); *H04L 5/0053* (2013.01)

(58) Field of Classification Search
CPC ............ H04W 72/1284; H04B 7/0417; H04B 2201/70701; H04L 5/0048; H04L 5/0051; H04L 5/0085; H04L 27/261; H04L 27/262; H04L 27/2613
See application file for complete search history.

(56) References Cited

U.S. PATENT DOCUMENTS

| | | |
|---|---|---|
| 2009/0041139 A1 | 2/2009 | Cho et al. |
| 2009/0268685 A1* | 10/2009 | Chen et al. .................... 370/329 |
| 2012/0207119 A1* | 8/2012 | Zhang et al. .................. 370/329 |

FOREIGN PATENT DOCUMENTS

| | | | |
|---|---|---|---|
| EP | 2306659 A2 | 4/2011 | |
| KR | 10-2011-0000536 A | 1/2011 | |
| WO | WO 2010117240 A2 * | 10/2010 | |
| WO | 2011043192 A1 | 4/2011 | |

OTHER PUBLICATIONS

Qualcomm Incorporated, "DM-RS in Support of UL Spatial Multiplexing", 3GPP TSG-RAN WG1 #59bis, R1-100691, Jan. 18-22, 2010 http://www.egpp.org/ftp/tsg_ran/WG1_RL1/TSGR1_59b/Docs/R1-100691.zip.
Panasonic, "View on UL DM-RS", 3GPP TSG RAN WG1 Meeting #59, R1-094508, Nov. 9-13, 2009 http://www.3gpp.org/ftp/tsg_ran/WG1_RL1/TSGR1_59/Docs/R1-094508.zip.

* cited by examiner

*Primary Examiner* — Pao Sinkantarakorn
*Assistant Examiner* — Stephen Steiner
(74) *Attorney, Agent, or Firm* — Dentons US LLP

(57) ABSTRACT

Disclosed are a method for transceiving a reference signal in a wireless connection system and a terminal therefor. More particularly, the method comprises the steps of: generating a plurality of uplink reference signal sequences; mapping the generated plurality of uplink reference signal sequences to each of three symbols in one frame; and transmitting the mapped uplink reference signals to a base station. The plurality of uplink reference signal sequences is generated by applying an orthogonal cover code having a length of 3.

12 Claims, 14 Drawing Sheets

FIG. 6
(a)
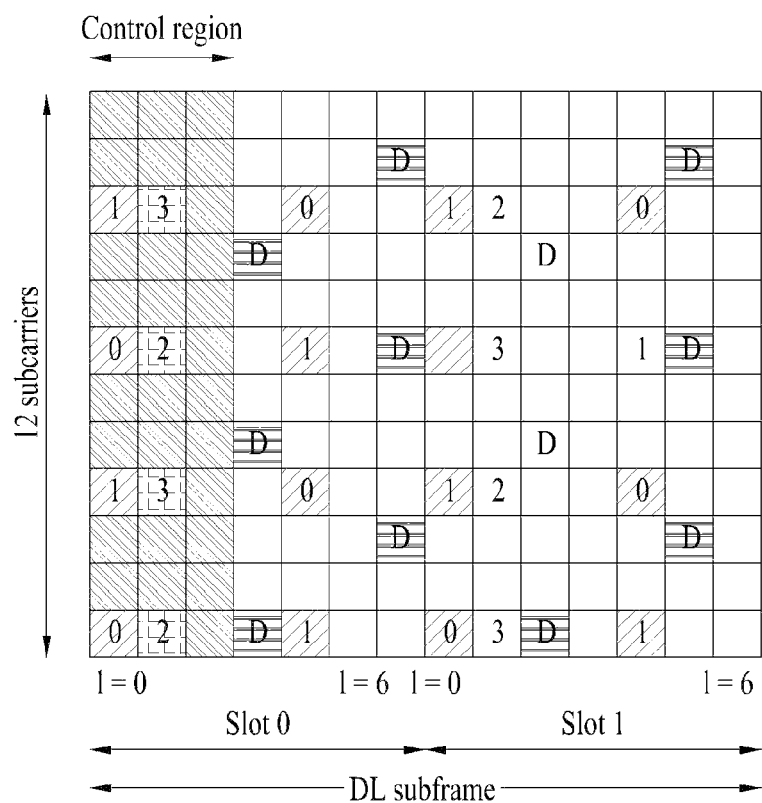
(b)
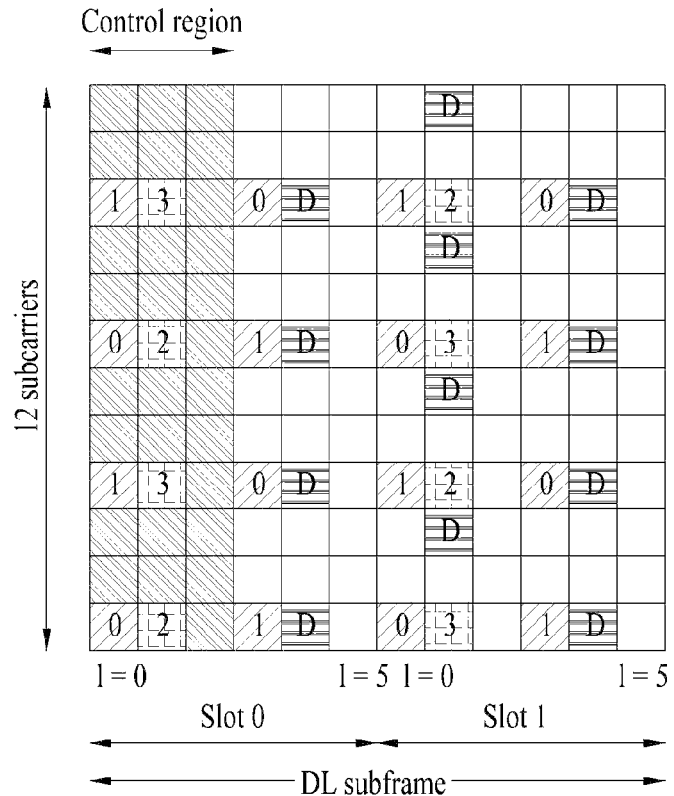

FIG. 9
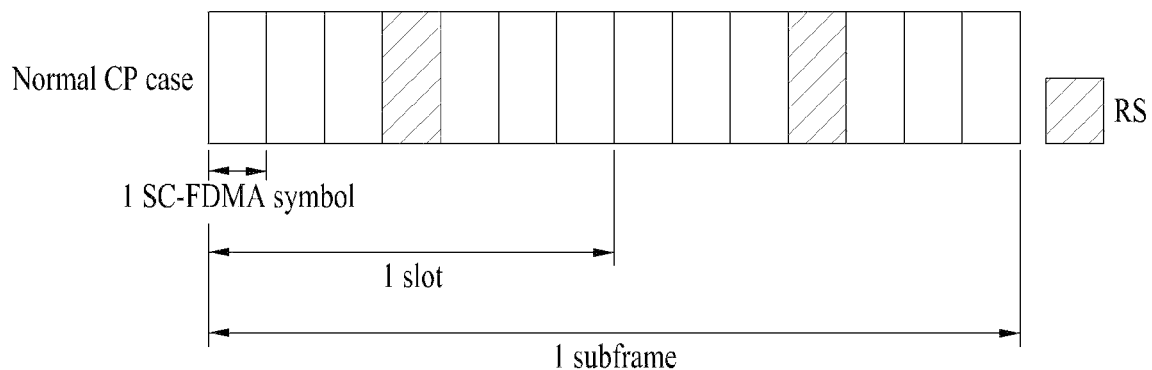
(a)
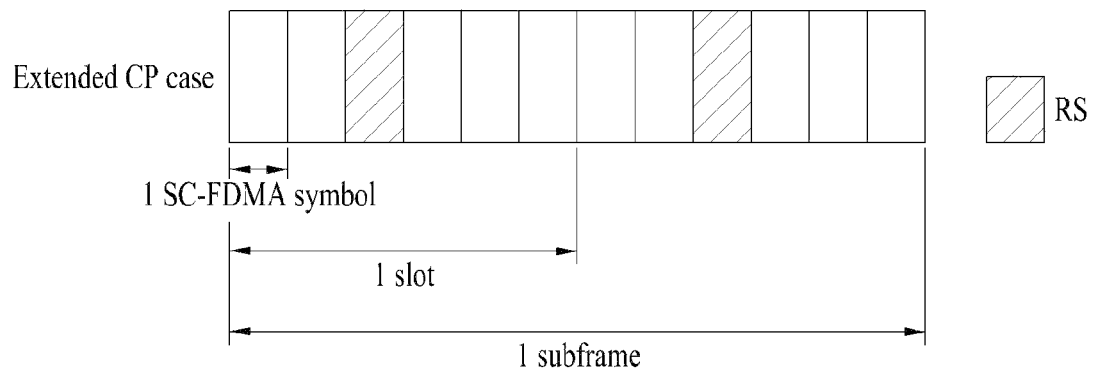
(b)

METHOD FOR TRANSCEIVING A REFERENCE SIGNAL IN A WIRELESS CONNECTION SYSTEM AND TERMINAL THEREFOR

This application is a 35 U.S.C. §371 National Stage Entry of International Application No. PCT/KR2012/005306, filed Jul. 4, 2012 and claims the benefit of U.S. Provisional Application No. 61/504,247, filed Jul. 4, 2011, all of which are incorporated by reference in their entirety herein.

TECHNICAL FIELD

The present invention relates to a wireless access system, and more particularly, to a method of transmitting and receiving an uplink reference signal in a carrier aggregation supportive wireless access system and an apparatus therefor.

BACKGROUND ART

One of the most significant requirements for the next generation wireless access system is the capability of supporting the high data rate requisite. To this end, many ongoing efforts are made to research and develop various technologies including MIMO (multiple input multiple output), CoMP (cooperative multiple point transmission), relay and the like.

In a wireless access system according to a related art, even if an uplink (UL) and a downlink (DL) are set to differ from each other in bandwidth, a single carrier is mainly taken into consideration. For instance, a wireless communication system having UL and DL carriers, each of which number is 1, and UL and DL bandwidths generally symmetric to each other is provided based on a single carrier.

Yet, considering the situation that frequency resources are saturated, as a method of securing broadband bandwidths to meet the higher data transmission rate requirements, CA (carrier aggregation/multiple cells) is introduced in a manner of designing each of scattered bandwidths to operate an independent system and aggregating a plurality of bands into a single system.

In this case, a carrier of an independently operable bandwidth unit is called a component carrier (hereinafter abbreviated CC). In order to support an increasing transmission size, 3GPP LTE-A or 802.16m keeps extending its bandwidth up to 20 MHz or higher. In this case, at least one or more component carriers are aggregated to support the broadband. For instance, if a single component carrier supports a bandwidth of 5 MHz, 10 MHz or 20 MHz, a system bandwidth is supported up to maximum 100 MHz by aggregating maximum 5 component carriers together.

DISCLOSURE OF THE INVENTION

Technical Tasks

One object of the present invention is to provide a method of smoothly transmitting/receiving a reference signal between a base station and a user equipment in a wireless access system, preferably, in a carrier aggregation supportive wireless access system and an apparatus therefor.

Another object of the present invention is to provide a method of estimating or compensating precise channel information for a fast-moving user equipment and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, a method for transmitting an uplink reference signal in a wireless access system includes generating a plurality of uplink reference signal sequences, mapping respectively the plurality of uplink reference signal sequences to 3 symbols within one subframe, and transmitting the plurality of uplink reference signals to a base station, wherein the plurality of uplink reference signal sequences are generated by applying an orthogonal cover code having a length of 3.

In another aspect of the present invention, a user equipment transmitting an uplink reference signal in a wireless access system includes an RF (radio frequency) unit configured to transceive a radio signal and a processor configured to generate a plurality of uplink reference signal sequences, map respectively the plurality of uplink reference signal sequences to 3 symbols within one subframe, and transmit the plurality of uplink reference signals to a base station, wherein the plurality of uplink reference signal sequences are generated by applying an orthogonal cover code having a length of 3.

Preferably, cyclic shift values different from each other are applied to the plurality of uplink reference signal sequences.

Preferably, the cyclic shift values are determined based on an index of the uplink reference signal transmitted in the same subframe.

Preferably, the cyclic shift values are determined based on an index of a subframe in which the uplink reference signal is transmitted and an index of the uplink reference signal transmitted in the same subframe.

Preferably, a part of the orthogonal cover code has orthogonality in accordance with a cyclic shift field within downlink control information or a layer.

Preferably, the orthogonal cover code for a second uplink reference signal within the subframe among the plurality of uplink reference signals has a same value irrespective of a cyclic shift code within downlink control information or a layer.

Preferably, the plurality of uplink reference signals are mapped such that the maximum number of symbols between the plurality of uplink reference signals transmitted in the same subframe corresponds to 3 or 4.

It is to be understood that both the foregoing general description and the following detailed description are exemplary and explanatory and are intended to provide further explanation of the invention as claimed.

Advantageous Effects

Accordingly, the present invention provides the following effects or advantages.

According to embodiment of the present invention, a reference signal can be smoothly transmitted and received between a base station and a user equipment in a wireless access system, preferably, in a carrier aggregation supportive wireless access system.

According to embodiment of the present invention, precise channel information can be estimated or compensated for a fast-moving user equipment in a carrier aggregation supportive wireless access system and an efficient rank adaptation is enabled.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a diagram for one example of a reference signal pattern mapped to a downlink resource block (RB) pair;

FIG. 9 is a diagram for a structure of a subframe to transit a demodulation reference signal;

MODE FOR INVENTION

Figure 1:
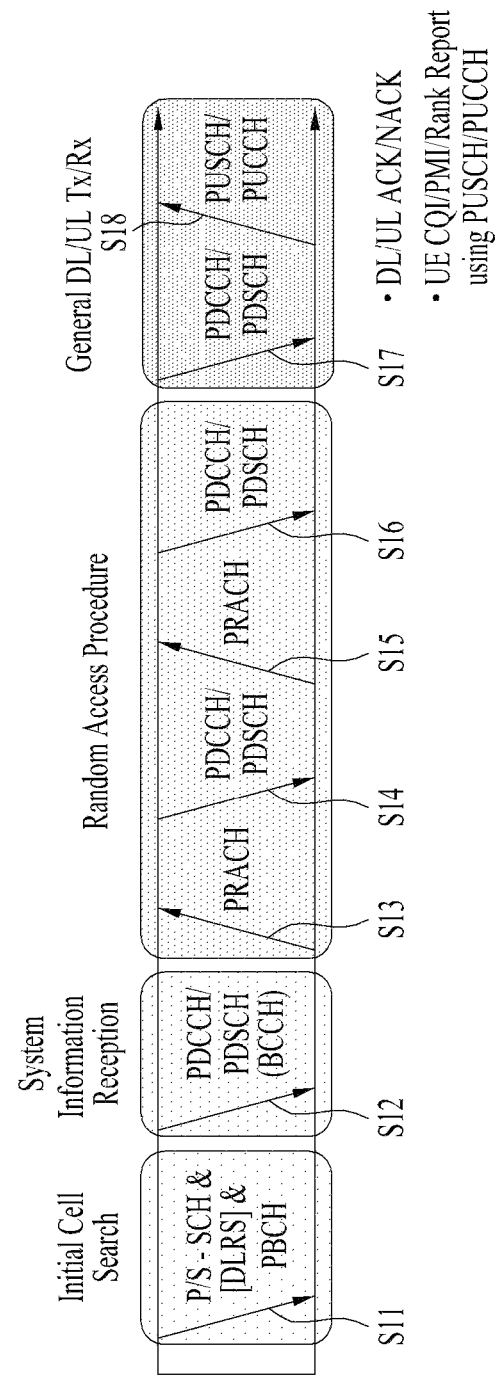
FIG. 1 is a diagram for explaining physical channels used for 3GPP system and a signal transmission using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE-A System to which the Present Invention is Applicable 1. 1. The General of System FIG. 1 is a diagram for explaining physical channels used for 3GPP system and a signal transmission using the same.

Referring to FIG. 1, if a power of a user equipment is turned on or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S12].

Meanwhile, the user equipment may be able to perform a random access procedure to complete the access to the base station [S13 to S16]. To this end, the user equipment may transmit a specific sequence as a preamble via a physical random access channel (PRACH) [S13] and may be then able to receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S17 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
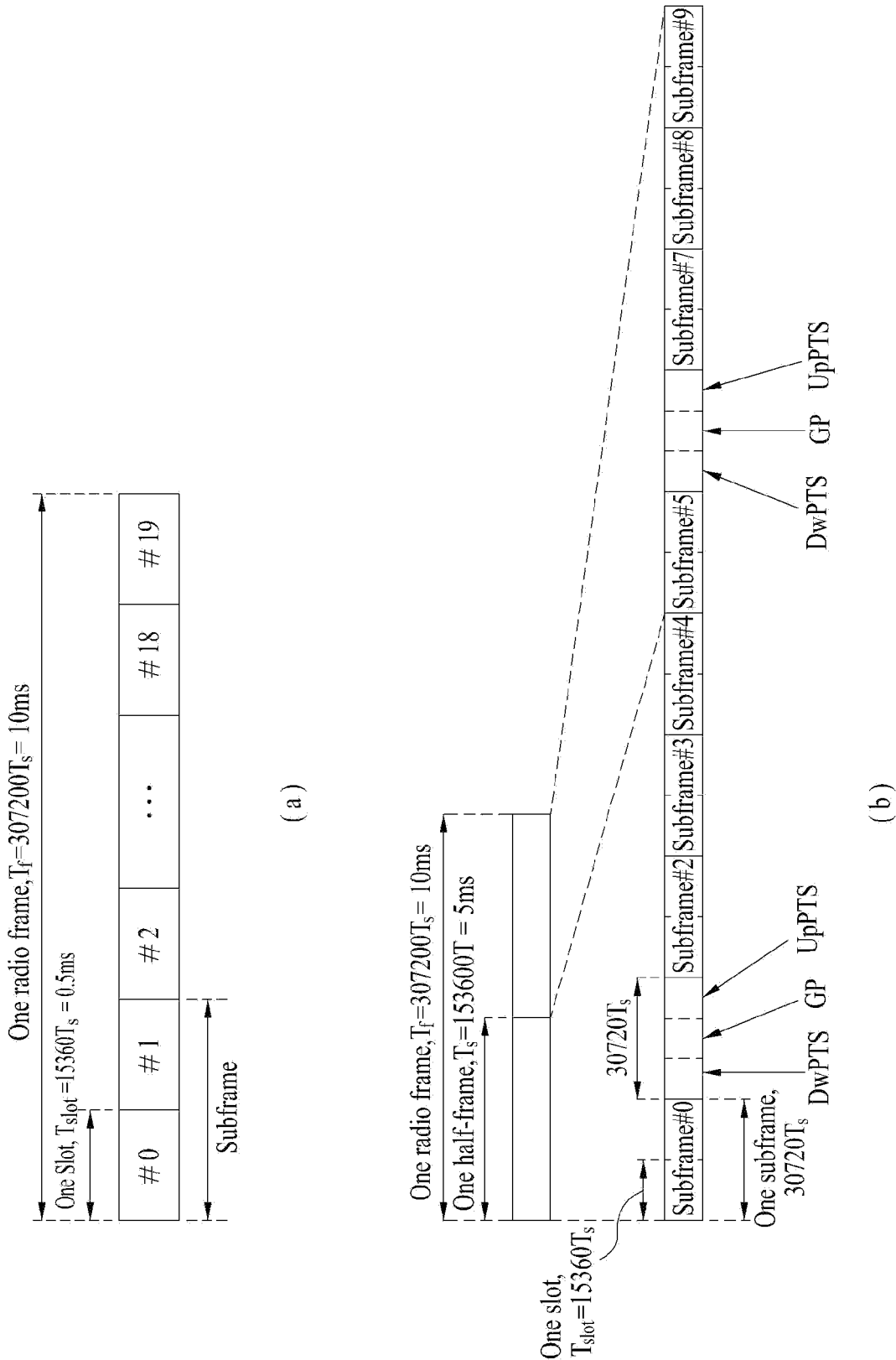
FIG. 2 is a diagram for a structure of a radio frame in 3GPP LTE.

FIG. 2 shows structures of radio frames in 3GPP LTE.

FIG. 2 (a) shows a frame structure type 1. This frame structure type 1 may be applicable to both a full duplex FDD (frequency division duplex) system and a half duplex FDD system.

One radio frame has a length of '$T_f=307200 \cdot T_s=10$ ms' and is constructed with 20 slots to which indexes 0 to 19 are respectively given with an equal length of '$T_{slot}=15360 \cdot T_s=0.5$ ms'. One subframe is defined as two contiguous slots. For example, an $i^{th}$ subframe is constructed with a slot corresponding to '2i' and a slot corresponding to '2i+1'. In particular, a radio frame includes 10 subframes.

And, a time taken to transmit one subframe is called a transmission time interval (hereinafter abbreviated TTI). In this case, Ts indicates a sampling time and may be represented as '$Ts=1/(15\ kHz \times 2048)=3.2552 \times 10^{-8}$ (i.e., about 33 ns)'. One slot may include a plurality of OFDM or SC-FDMA symbols in time domain and may include a plurality of resource blocks (RBs) in frequency domain.

One slot includes a plurality of OFDM (orthogonal frequency division multiplexing) symbols in time domain. Since 3GPP uses OFDMA in downlink, OFDM symbol is provided to indicate one symbol period. The OFDM symbol may be named one SC-FDMA symbol or symbol period. Resource block (RB) is a resource allocation unit and may include a plurality of contiguous subcarriers in one slot.

In the full duplex FDD system, 10 subframes are simultaneously usable for DL and UL transmissions in each 10 ms interval. In doing so, the UL transmission and the DL transmission are separated from each other in frequency domain. On the contrary, in the half duplex FDD system, a user equipment is unable to perform a transmission and a reception at the same time.

The above-described structure of the radio frame is one example only. And, the number of subframes included in a radio frame, the number of slots included in the subframe and the number of symbols included in the slot may be modified in various ways.

FIG. 2 (b) shows a frame structure type 2. The frame structure type 2 is applicable to the TDD system. One radio frame has a length of '$T_f=307200 \cdot T_s=10$ ms' and is constructed with 2 half-frames each of which has a length of '$15360 \cdot T_s=0.5$ ms'. Each of the half-frames is constructed with 5 subframes each of which has a length of '$30720 \cdot T_s=1$ ms'. For example, an $i^{th}$ subframe is constructed with a slot corresponding to '2i' and a slot corresponding to '2i+1', each of which has a length of '$T_{slot}=15360 \cdot T_s=0.5$ ms'. In this case, Ts indicates a sampling time and may be represented as '$Ts=1/(15\ kHz \times 2048)=3.2552 \times 10^{-8}$ (i.e., about 33 ns)'.

The type 2 frame includes a special subframe constructed with 3 kinds of fields including DwPTS (downlink pilot time slot), GP (guard period) and UpPTS (uplink pilot time slot). The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

Table 1 shows a configuration (length of DwPTS/GP/UpPTS) of a special frame.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In a frame structure type 2, UL-DL configuration indicates that all subframes are assigned to (reserved) UL and DL by a prescribed rule. Table 2 shows UL-DL configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in each subframe of a radio frame, 'D' indicates a subframe for DL transmission, 'U' indicates a subframe for UL transmission, and 'S' indicates a special subframe constructed with 3 kinds of fields including DwPTS, GP and UpPTS. UL-DL configurations may be classified into 7 types. And, the respective configurations differ from each other in the positions or number of DL subframes, special frames and UL subframes.

A point of switching DL to UL or a point of switching UL to DL is called a switching point. Switch-point periodicity means a period in which a switching operation between UL and DL subframes is identically repeated and supports both 5 ms and 10 ms. In case of the 5 ms DL-UL switch-point periodicity, a special subframe (S) exists in every half-frame. In case of the 10 ms DL-UL switch-point periodicity, a special subframe (S) exists in a $1^{st}$ half-frame only.

In all configurations, $0^{th}$ subframe, $5^{th}$ subframe and DwPTS are intervals provided for a DL transmission only. UpPTS and a subframe directly contiguous with a special subframe are always intervals for a UL transmission.

The above-mentioned UL-DL configuration is system information. The configuration may be known to both a base station and a user equipment. The base station is able to inform the user equipment of a change of the UL-DL assigned state of a radio frame in a manner of transmitting an index of configuration information only whenever the UL-DL configuration information is changed. The configuration information is a sort of DL control information and can be transmitted on PDCCH (physical downlink control channel), which is a DL control channel, similar to other scheduling information. Moreover, the configuration information is broadcast information and can be commonly transmitted to all user equipments in a cell on a broadcast channel. In the TDD system, the number of half-frames included in a radio frame, the number of subframes included in the half-frame and a combination of DL and UL subframes are just exemplary.

Figure 3:
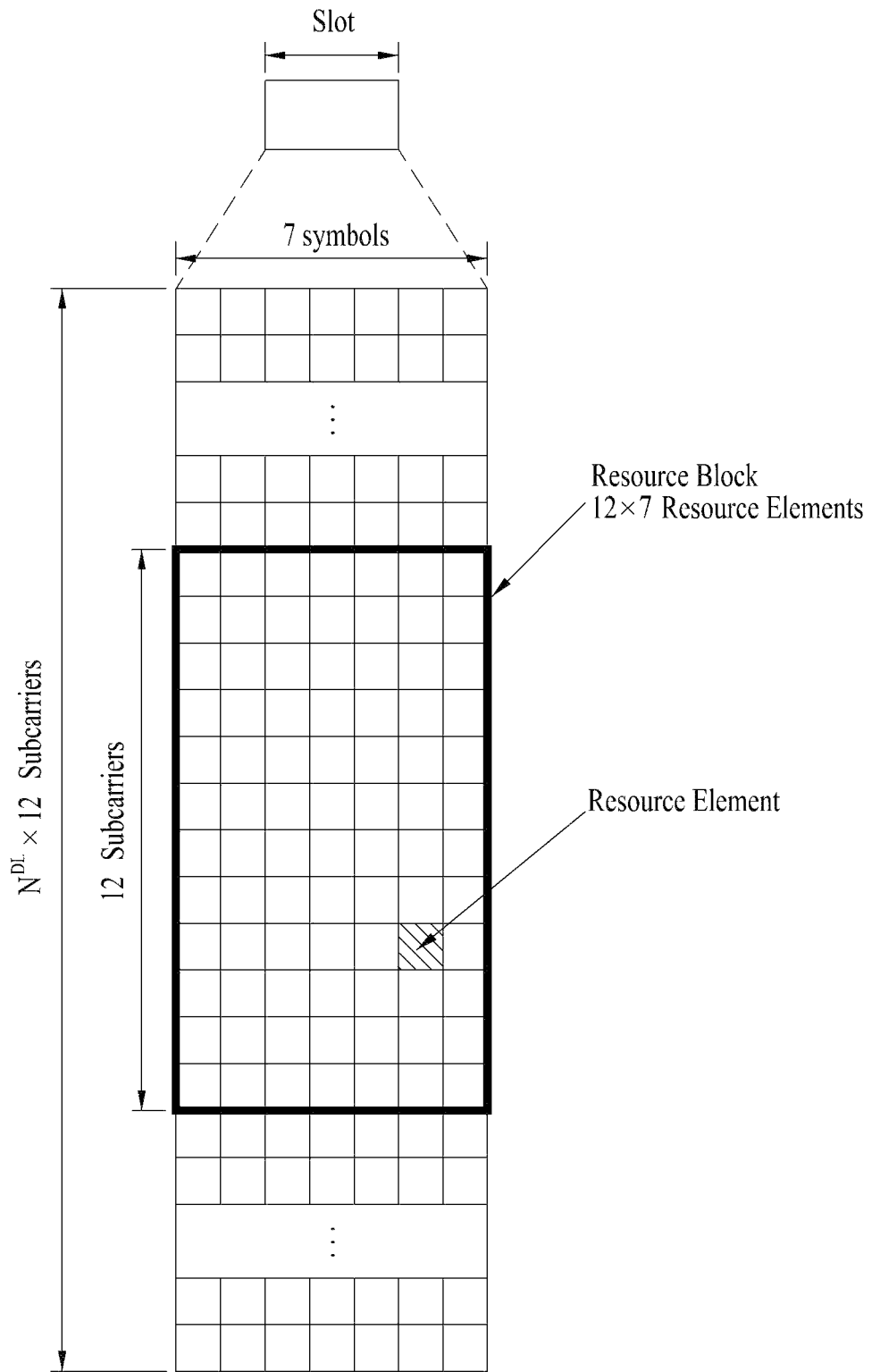
FIG. 3 is a diagram for one example of a resource grid for a downlink slot.

FIG. 3 is a diagram for one example of a resource grid for one downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
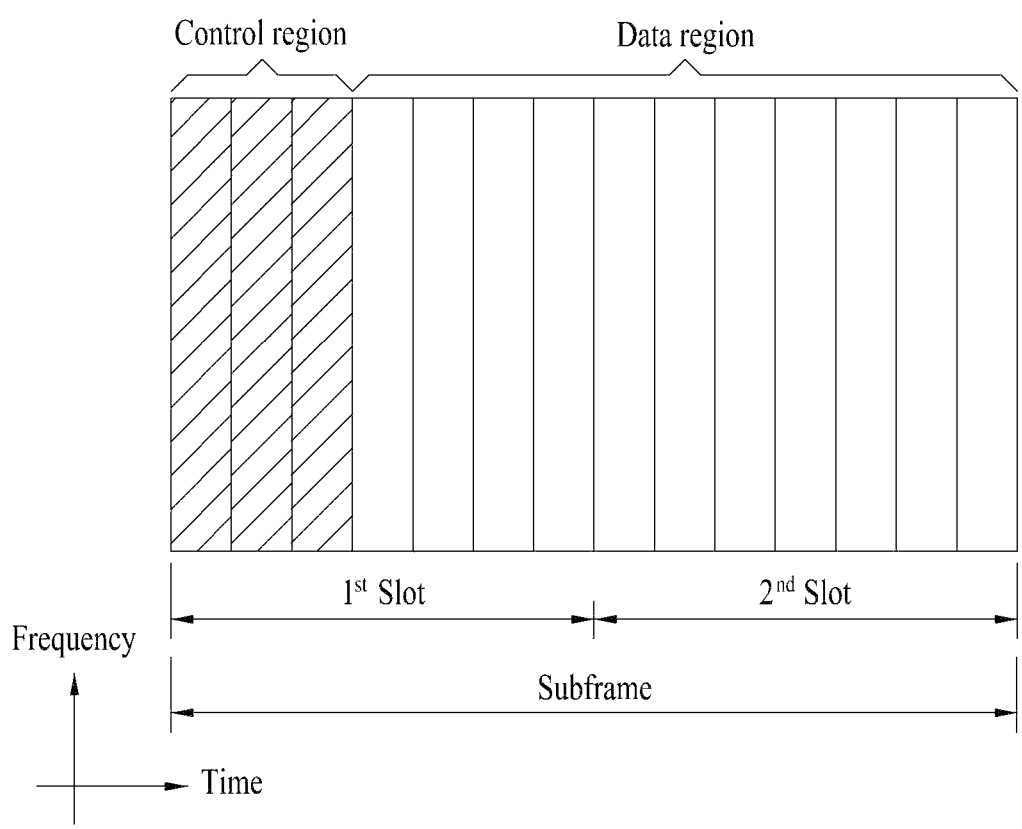
FIG. 4 is a diagram for a structure of an uplink subframe.

FIG. 4 is a diagram for a structure of an uplink (UL) subframe.

Referring to FIG. 4, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

Figure 5:
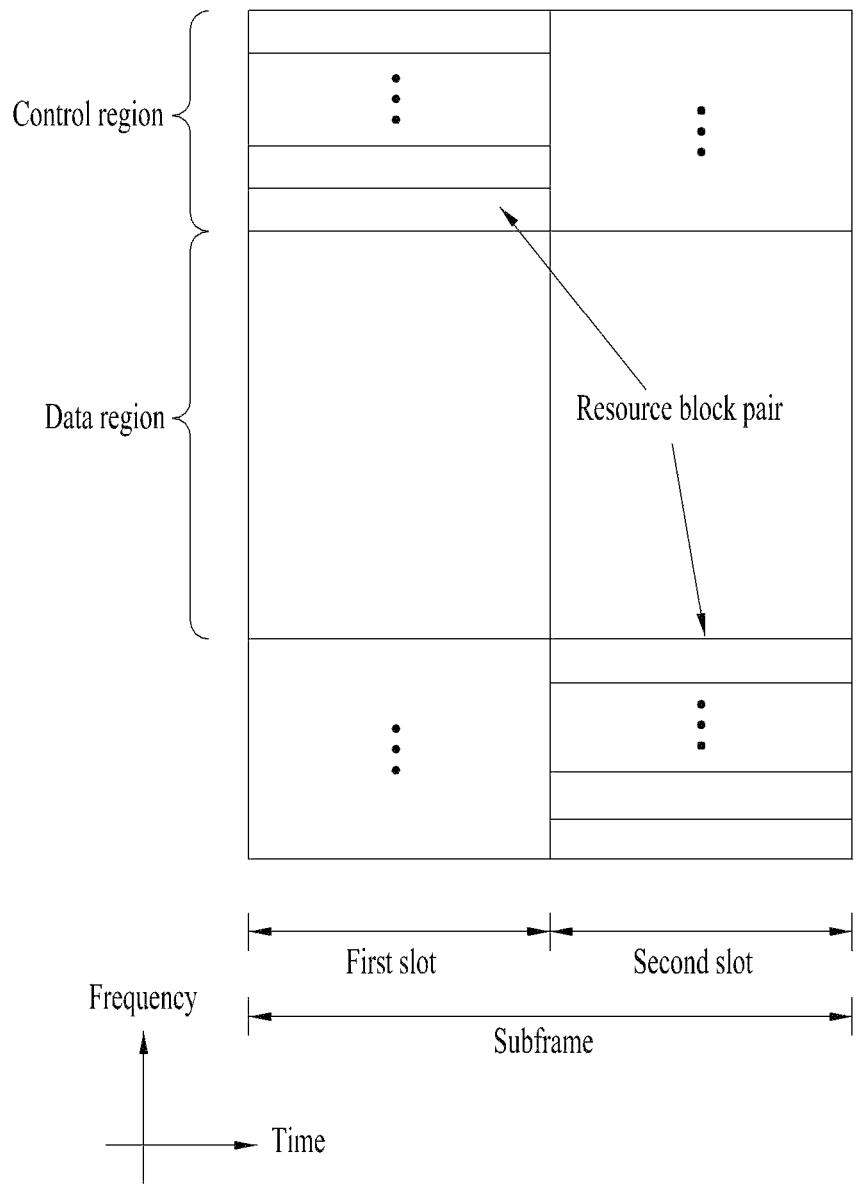
FIG. 5 is a diagram for a structure of a downlink subframe.

FIG. 5 is a diagram for a structure of a downlink (DL) subframe.

Referring to FIG. 5, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried on PDCCH may be called downlink control information (hereinafter abbreviated DCI). The DCI may include UL resource allocation information, DL resource allocation information or a UL transmission (Tx) power control command for a random UE (user equipment) group.

1. 2. PDCCH (Physical Downlink Control Channel)

1. 2. 1. The General of PDCCH

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor the plurality of PDCCHs. PDCCH is configured with the aggregation of at least one or more contiguous CCEs (control channel elements). The PDCCH configured with the aggregation of the at least one or more contiguous CCEs undergoes subblock interleaving and may be then transmitted via the control region. CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs.

1. 2. 2. PDCCH Structure

A plurality of PDCCHs multiplexed for a plurality of user equipments can be transmitted in a control region. PDCCH is configured with one CCE or the aggregation of at least 2 contiguous CCEs [CCE aggregation]. In this case, the CCE means a unit corresponding to 9 sets of REGs each of which is configured with 4 resource elements. And, 4 QPSK (quadrature phase shift keying) symbols are mapped to each of the REGs. Resource elements occupied by RS (reference signal) are not included in the REG. In particular, the total number of REGs in OFDM symbol may vary by depending on whether a cell-specific reference signal exists. The concept of REG for mapping 4 resource elements to one group may apply to other DL control channels (e.g., PCFICH, PHICH, etc.). Assuming that REG not assigned to PCFICH or PHICH is set to $N_{REG}$, the number of CCEs available for a system is represented as '$N_{CCE}=\lfloor N_{REG}/9 \rfloor$' and indexes 0 to '$N_{CCE}-1$' are given to the CCEs in order, respectively.

In order to simplify a decoding process of a user equipment, PDCCH format including n CCEs may start with CCE having an index equal to the multiple of n. In particular, if a CCE index is i, the PDCCH format may start with the CCE that satisfies the equation 'i mod n=0'.

In order to configure a single PDCCH signal, a base station may be able to use CCEs, of which number belongs to {1, 2, 4, 8}. In this case, {1, 2, 4, 8} is called a CCE aggregation level. The number of CCEs used for a transmission of a specific PDCCH is determined by a base station in accordance with a channel state. For instance, a single CCE may be sufficient for a PDCCH provided for a user equipment having a good DL channel state (e.g., a case that the user equipment is located in the vicinity of a base station). On the other hand, in case of a user equipment having a poor channel state (e.g., a case that the user equipment is located on a cell edge or boundary), 8 CCEs may be required for sufficient robustness. Besides, a power level of PDCCH may be adjusted in a manner of being matched to the channel state.

Table 3 shows PDCCH format. 4 kinds of PDCCH formats are supported in accordance with CCE aggregation levels.

TABLE 3

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

User equipments differ from each other in CCE aggregation level. This is because a format or MCS (modulation and coding scheme) level of control information carried on PDCCH is different. In this case, the MCS level means a code rate used for data coding and a modulation order. An adaptive MCS level is used for a link adaptation. Generally, in a control channel for transmitting control information, 3 or 4 MCS levels may be taken into consideration.

In the following description, PDCCH is explained in detail. First of all, control information carried on PDCCH may be called downlink control information (DCI). A configuration of information loaded on PDCCH payload may vary in accordance with DCI format. In this case, the PDCCH payload may mean information bit(s). Table 4 shows DCI in accordance with DCI format.

TABLE 4

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 4, DCI formats may include a format 0 for PUSCH scheduling, a format 1 for scheduling of one PDSCH codeword, a format 1A for compact scheduling of one PDSCH codeword, a format IC for very compact scheduling of DL-SCH, a format 2 for PDSCH scheduling in closed-loop spatial multiplexing mode, a format 2A for PDSCH scheduling in open-loop spatial multiplexing mode, a format 3 for a transmission of a TPC (transmission power control) command for a UL channel, and a format 3A for a transmission of a TPC (transmission power control) command for a UL channel. Moreover, a DCI format 1A is usable for PDSCH scheduling despite that any kind of transmission mode is set for a user equipment.

PDCCH payload length may vary in accordance with DCI format. A PDCCH payload type and a length thereof may vary in accordance with a presence or non-presence of a compact scheduling, a transmission mode configured for a user equipment, or the like.

The transmission mode may be configured in order for a user equipment to receive DL data on PDSCH. For instance, the DL data on PDSCH may include scheduled data for a user equipment, paging, random access response, broadcast information via BCCH and the like. The DL data on PDSCH is related to the DCI format signaled via PDCCH. The transmission mode may be semi-statically configured by an upper layer signaling (e.g., RRC (radio resource control) signaling, etc.). The transmission mode may be categorized into a single antenna transmission and a multi-antenna transmission. A transmission mode is semi-statically configured for a user equipment by the upper layer signaling. For instance, the multi-antenna transmission may include transmit diversity, open-loop spatial multiplexing, closed-loop spatial multiplexing, MU-MIMO (multiuser-multiple input multiple output), beamforming or the like. The transmit diversity is the technology of raising transmission reliability by transmitting the same data via multiple transmitting antennas. The spatial multiplexing is the technology of transmitting high-speed data without increasing a bandwidth of a system by simultaneously transmitting different data via multiple transmitting antennas. The beamforming is the technology of increasing SINR (signal to interference plus noise ratio) of a signal by adding a weight in accordance with a channel state at multi-antenna.

DCI format depends on a transmission mode configured in a user equipment. The user equipment has a reference DCI format of monitoring in a transmission mode configured for the user equipment. The transmission mode configured in the user equipment may correspond to one of 7 transmission modes as follows.

(1) Single antenna port: Port 0
(2) Transmit diversity
(3) Open-loop spatial multiplexing
(4) Closed-loop spatial multiplexing
(5) Multi-user MIMO
(6) Closed-loop rank=1 precoding
(7) Single antenna port: Port 5

1. 2. 3. PDCCH Transmission

A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Subsequently, the base station creates coded data by performing channel coding on the CRC attached control information. In doing so, the channel coding may be performed at a code rate in accordance with an MCS level. The base station performs a rate matching in accordance with a CCE aggregation level assigned to PDCCH format and then generates modulated symbols by modulating the coded data. In doing so, it may be able to use a modulation sequence in accordance with an MCS level. The modulated symbols configuring one PDCCH may have a CCE aggregation level set to one of 1, 2, 4 and 8. Thereafter, the base station maps the modulated symbols to physical resource elements [CCE to RE mapping].

1. 2. 4. Blind Decoding

A plurality of PDCCHs can be transmitted in a single subframe. In particular, a control region of one subframe is configured with a plurality of CCEs having indexes set to 0 to ($N_{CCE,k}$−1). In particular, the $N_{CCE,k}$ means the total number of CCEs in a control region of $k^{th}$ subframe. A user equipment monitors a plurality of PDCCHs in each subframe. In this case, the verb 'monitor' means that the user equipment attempts decoding of each of the PDCCHs in accordance with a monitored PDCCH format. In a control region assigned within a subframe, a base station does not provide information indicating where a PDCCH corresponding to the user equipment is located. In order to receive a control channel transmitted from the base station, since the user equipment is unable to know that its PDCCH is transmitted in a specific DCI format or on a specific CCE aggregation level at a specific position, the user equipment finds its PDCCH by monitoring an aggregation of PDCCH candidates in a subframe. This is called a blind decoding/detection (BD). According to the blind decoding, a user equipment takes its UE ID (user equipment identifier) from a CRC part by demasking and then confirms whether the corresponding PDCCH is a control channel of the user equipment by checking CRC error.

In an active mode, a user equipment monitors PDCCH of every subframe to receive data transmitted to the user equipment. In DRX mode, a user equipment wakes up in a monitoring interval of each DRX period and then monitors PDCCH in a subframe corresponding to the monitoring interval. In doing so, a subframe for monitoring PDCCH is called a non-DRX subframe.

The user equipment should perform blind decoding on all CCEs existing in a control region of the non-DRX subframe on order to receive PDCCH transmitted to the user equipment. Since the user equipment does not know which PDCCH format will be received, it should decode all PDCCHs on possible CCE aggregation levels in every non-DRX subframe until succeeding in the blind decoding of PDCCHs. Moreover, since the user equipment does not know how many CCEs will be used by the PDCCH for the user equipment, the user equipment should attempt detection on all possible CCE aggregation levels until succeeding in the blind decoding of PDCCH. The user equipment performs the blind decoding according to the CCE aggregation level. In particular, the user equipment attempts decoding with a CCE aggregation level unit of 1. If fails to decode all with the CCE aggregation level unit of 1, the user equipment attempts decoding with a CCE aggregation level unit of 2. Subsequently, the user equipment attempts decoding with a CCE aggregation level unit of 4 and 8, respectively. Moreover, the user equipment attempts blind decoding on all of C-RNTI, P-RNTI, SI-RNTI, and RA-RNTI. The user equipment attempts blind decoding on all DCI formats which are to be monitored by the user equipment.

If a user equipment attempts blind decoding on all available RNTI and all DCI formats to be monitored according to all CCE aggregation levels, the number of detection attempts may be excessively enormous. Hence, a concept of a search space (SS) is defined for a blind decoding performed by a user equipment in LTE system. A search space means a PDCCH candidate set to be monitored and may have a size different in accordance with each PDCCH format.

The search space may be configured with a common search space (CSS) and a UE-specific/dedicated search space (USS). In case of the common search space, all user equipments may be able to know a size of the common search space. On the other hand, the UE-specific search space may be individually set for each of the user equipments. Hence, a user equipment should monitor both of the UE-specific search space and the common search space to decode PDCCH, thereby performing the blind decoding (BD) in a single frame 44 times to the maximum. In doing so, the blind decoding performed in accordance with a different CRC value (e.g., C-RNTI, P-RNTI, SI-RNTI, RA-RNTI) is not included.

Due to a small search space, it may happen that a base station is unable to reserve CCE resources enough to transmit PDCCH to all user equipments attempting to transmit PDCCH in a given subframe. This is because resources remaining after assignment of CCE positions may not be included in a search space of a specific user equipment. In order to minimize this barrier that may be kept in a next subframe, a UE-specific hopping sequence may apply to a start point of the UE-specific search space.

Table 5 shows sizes of a common search space and a UE-specific search space.

TABLE 5

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

In order to reduce a calculation load of a user equipment due to a blind decoding attempt count, a user equipment does not perform searches in accordance with all the defined DCI formats at the same time. In particular, the user equipment always searches a UE-search space for DCI format 0 and DCI format 1A. In doing so, although the DCI format 0 and the DCI format 1A are equal to each other in size, the user equipment is able to identify DCI formats using flags used to identify the DCI format 0 and the DCI format 1A included in PDCCH [Flags for format 0/format 1A differentiation]. Moreover, DCI formats other than the DCI format 0 or the DCI format 1A may be requested to the user equipment according to a PDSCH transmission mode configured by a base station. For example, the requested DCI formats may include DCI format 1, DCI format 1B and DCI format 2.

A user equipment may be able to search a common search space for DCI format 1A and DCI format IC. Moreover, the user equipment may be set to search for DCI format 3 or DCI format 3A. In this case, although the DCI format 3/A may have the same size of the DCI format 0/1A, the user equipment may be able to identify a DCI format using CRC scrambled by an identifier other than a UE-specific identifier.

Search space $S_k^{(L)}$ means a PDCCH candidate set in accordance with an aggregation level $L \in \{1,2,4,8\}$. CCE in accordance with a PDCCH candidate set m of the search space may be determined by Formula 1.

$$L \cdot \{(Y_k+m) \bmod \lfloor N_{CCE,k}/L \rfloor\}+i \quad \text{[Formula 1]}$$

In Formula 1, $M^{(L)}$ indicates the number of PDCCH candidates in accordance with a CCE aggregation level L to be monitored in a search space, where m=0, . . . , $M^{(L)}-1$. The i is an index for designating an individual CCE in each of PDCCH candidates and may be represented as 'i=0, . . . , L-1'.

In order to decode PDCCH, as mentioned in the foregoing description, a user equipment monitors both a UE-specific search space and a common search space. In this case, the common search space (CSS) supports PDCCHs having the aggregation level of {4, 8}, while the UE-specific search space (USS) supports PDCCHs having the aggregation level of {1, 2, 4, 8}.

Table 6 shows PDCCH candidates monitored by a user equipment.

TABLE 6

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Formula 1, in case of a common search space, for two aggregation levels, L=4 and L=8, $Y_k$ is set to 0. On the contrary, in case of a UE-specific search space, for an aggregation level L, $Y_k$ is defined as Formula 2.

$$Y_k = (A \cdot Y_{k-1}) \bmod D \quad \text{[Formula 2]}$$

1. 3. Reference Signal (RS)
1. 3. 1. Downlink Reference Signal

Since data is transmitted via a radio channel in a wireless communication system, a signal can be distorted in the midst of being transmitted. In order for a receiving end to receive the distorted signal properly, distortion of the received signal should be calibrated using channel information. In this case, a reference signal (RS) known to both a transmitting side and a receiving side can be used to detect the channel information. The reference signal can be called a pilot signal as well.

In case of transmitting and receiving data using a MIMO antenna, it is preferable that a channel state between a transmission antenna and a reception antenna is detected in order for a receiving side to precisely receive a signal. In this case, in order for the receiving side to detect the channel state, it is preferable that each of the transmission antennas of the transmitting side has an individual reference signal.

A downlink reference signal is classified into a common reference signal (CRS) shared by all user equipments in a cell and a dedicated reference signal (DRS) for a specific user equipment only. The transmitting side can provides information used for a demodulation and a channel measurement to the receiving side using the reference signals (CRS and DRS).

A receiving side (i.e., a user equipment) measures a channel state using a CRS and feedbacks such a channel quality-related indicator as a CQI (channel quality indicator), a PMI (precoding matrix index), and/or an RI (rank indicator) to a transmitting side (i.e., a base station). In embodiments of the present invention, the CRS is also called a cell-specific reference signal. On the contrary, a reference signal related to the feedback of channel state information (CSI) can be defined as a CSI-RS.

The DRS can be transmitted to user equipments via resource elements in case that data demodulation on PDSCH is required. A user equipment may be able to receive whether the DRS exists via an upper layer signaling. The DRS is valid when the corresponding PDSCH signal is mapped only. In embodiments of the present invention, the DRS can be called a UE-specific reference signal (UE-specific RS) or a demodulation reference signal (DMRS).

FIG. 6 is a diagram for one example of a reference signal pattern mapped to a downlink resource block (RB) pair defined by 3GPP LTE system.

Referring to FIG. 6, a downlink resource block pair as a unit of mapping a reference signal can be represented as 'one subframe in time domain×12 subcarriers in frequency domain'. In particular, one resource block pair in a time axis (x axis) has a length of 14 OFDM symbols in case of a normal cyclic prefix (normal CP) (refer to FIG. 6 (a)) and has a length of 12 OFDM symbols in case of an extended cyclic prefix (extended CP) (refer to FIG. 6 (b)).

Referring to FIG. 6, Resource elements (Res) represented by '0', '1', '2', and '3' on each of resource blocks mean resource elements to which CRS corresponding to each of antenna port '0', '1', '2', and '3' of a transmitting side (e.g. base station) is mapped. The resource elements written as 'D' mean the resource elements to which the DRS are mapped.

In the following description, CRS is explained in more detail.

The CRS is used to estimate a channel of a physical antenna and distributed to a whole frequency band as a reference signal capable of being commonly received by all user equipments situated within a cell. And, the CRS can be used for channel quality information (CSI) and a data demodulation.

The CRS can be defined as various formats according to antenna arrangement of a transmitting side (e.g., base station). A transmitting side can support up to 4 transmission antennas in 3GPP LTE system (e.g., Rel-8/9).

When a MIMO antenna is supported and reference signals are transmitted from at least one antenna port, the reference signals are transmitted via specific resource elements according to a prescribed pattern. In this case, a resource element transmitting a reference signal for an antenna port does not transmit a reference signal for a different antenna port. In particular, reference signals between antennas different from each other do not overlap with each other.

1. 3. 2. Uplink Reference Signal

Figure 7:
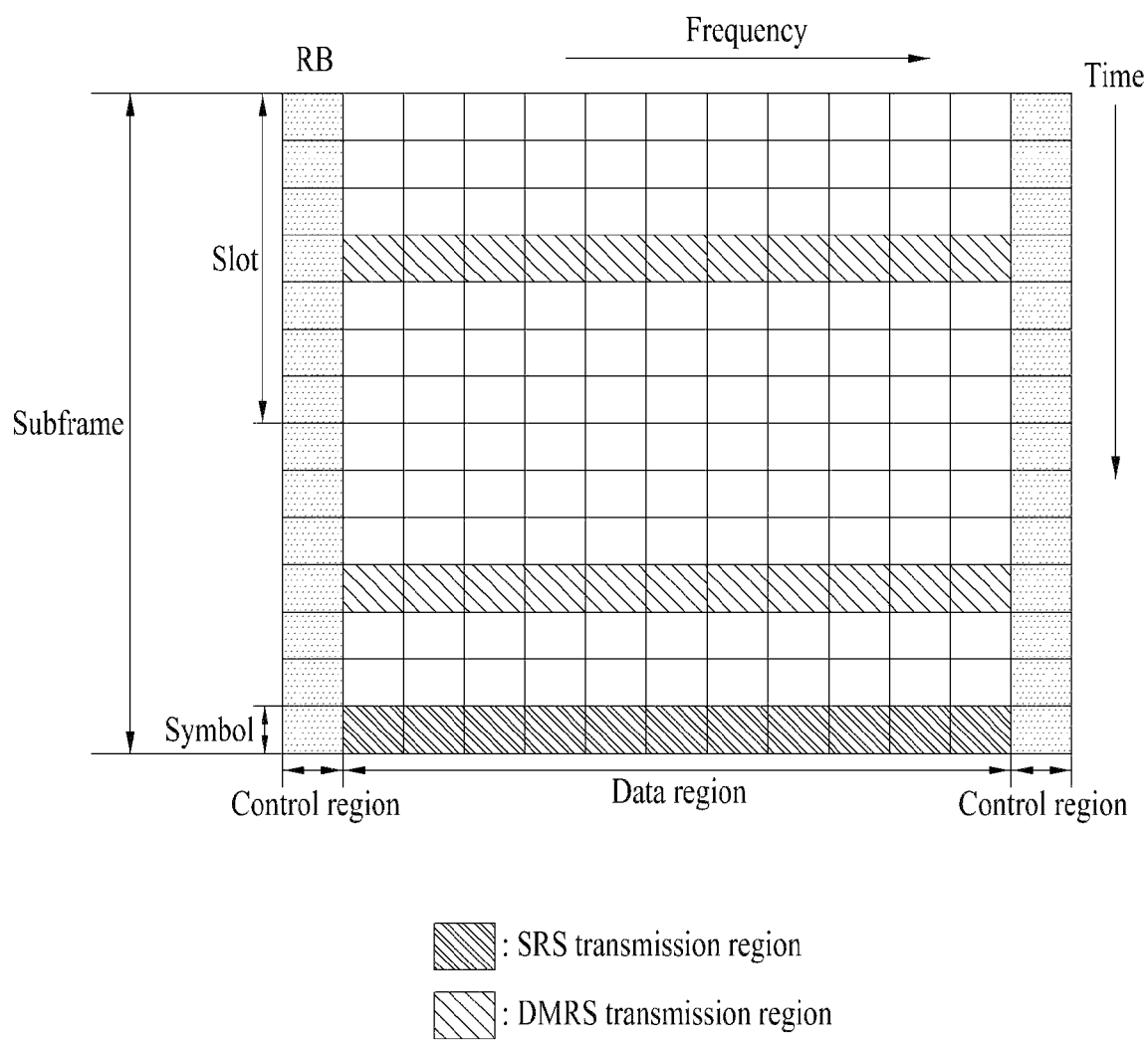
FIG. 7 is a different diagram for a structure of an uplink subframe.

FIG. 7 is a different diagram for a structure of an uplink subframe.

Referring to FIG. 7, a sounding reference signal (SRS) can be periodically or non-periodically transmitted by a user equipment to estimate a channel on an uplink band (sub band) except a band to which PUSCH is transmitted or to obtain channel information on a whole uplink bandwidth (wide band). In case of transmitting the sounding reference signal periodically, an interval is determined by an upper layer signal. A non-periodical transmission of a sounding reference signal is indicated by a base station using an 'SRS request' field of PDCCH uplink/downlink DCI format. Or, the base station can transmit a triggering message to transmit a non-periodical sounding reference signal. As depicted in FIG. 7, a region to which a sounding reference signal is capable of being transmitted in a subframe corresponds to a section where an SC-FDMA symbol is positioned at the last in time axis in the subframe. Sounding reference signals of a plurality of user equipments transmitted to the last SC-FDMA of a same subframe can be classified according to a position of a frequency. Unlike PUSCH, a sounding reference signal does not perform a DFT (Discrete Fourier Transform) calculation used for converting to SC-FDMA and is transmitted without using a precoding matrix used in the PUSCH.

Moreover, a region to which a demodulation reference signal (DMRS) is transmitted in a subframe corresponds to a section where SC-FDMA symbol is positioned in the center of each slot in time axis. Similarly, the DMRS is transmitted via a data transmission band on frequency axis. For instance, the DMRS is transmitted on a $4^{th}$ SC-FDMA symbol and an $11^{th}$ SC-FDMA symbol in a subframe to which a normal cyclic prefix is applied.

A demodulation reference signal can be combined with a transmission of PUSCH or PUCCH. A sounding reference signal is a reference signal transmitted to a base station by a user equipment to schedule an uplink scheduling. The base station estimates an uplink channel via the received sounding reference signal and uses the estimated uplink channel for an uplink scheduling. A sounding reference signal is not combined with a transmission of PUSCH or PUCCH. A same type of basic sequence can be used for the demodulation reference signal and the sounding reference signal. Meanwhile, a precoding applied to the modulation reference signal in an uplink MIMO antenna transmission may be identical to a precoding applied to PUSCH.

Figure 8:
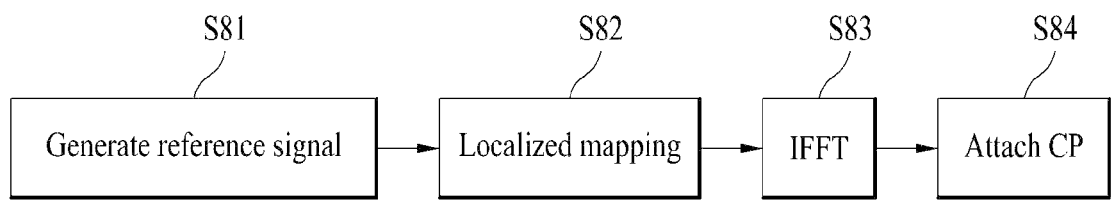
FIG. 8 is a flowchart for explaining a signal processing process to transmit a reference signal in uplink.

FIG. 8 is a flowchart for explaining a signal processing process to transmit a reference signal in uplink.

As depicted in FIG. 8, a data generates a signal in time domain and is transmitted via IFFT after being mapped to a frequency via a precoder. On the contrary, a process of passing through a DFT precoder is omitted for a reference signal. Specifically, a reference sequence is directly generated [S81] in frequency domain and is transmitted after being sequentially underwent a localized mapping [S82], IFFT [S83] process, and a cyclic prefix (CP) attachment process [S84].

FIG. 9 is a diagram for a structure of a subframe to transit a demodulation reference signal.

FIG. 9 (a) shows a subframe structure to transmit a demodulation reference signal in case of a normal cyclic prefix (CP) and FIG. 9 (b) shows a subframe structure to transmit a demodulation reference signal in case of an extended cyclic prefix (CP). Referring to FIG. 9 (a), a demodulation reference signal is transmitted on a $4^{th}$ and $11^{th}$ SC-FDMA symbol in case of the normal CP. Referring to FIG. 9 (b), a demodulation reference signal is transmitted on a $3^{rd}$ and $9^{th}$ SC-FDMA symbol in case of the extended CP.

1. 3. 2. 1. Demodulation Reference Signal (DMRS) for PUSCH

A reference signal for PUSCH is determined as follows.

A reference signal sequence $r_{PUSCH}^{(\lambda)}(\cdot)$ SCH for PUSCH corresponds to a layer index $\lambda \in \{0, 1, \ldots, \upsilon-1\}$ and defined as Formula 3 as follows.

$$r_{PUSCH}^{(\lambda)}(m \cdot M_{sc}^{RS} + n) = w^{(\lambda)}(m) r_{u,v}^{(\alpha_\lambda)}(n) \qquad \text{[Formula 3]}$$

In this case, m and n satisfy $$m = 0, 1$$
$$n = 0, \ldots, M_{sc}^{RS} - 1$$

and $M_{sc}^{RS} = M_{sc}^{PUSCH}$.

An orthogonal sequence $w^{(\lambda)}(m)$ is set to $[w^\lambda(0)\ w^\lambda(1)] = [1\ 1]$ for a DCI format 0 when an upper layer parameter 'Activate-DMRS-with OCC' is not set or a temporary C-RNTI is used to transmit DCI, which is related to a most recent uplink. On the contrary, according to a cyclic shift field included in the DCI, which is related to the most recent uplink, for a transport block related to a corresponding PUSCH transmission, the orthogonal sequence can be configured as Table 7 as follows.

$[w^{(\lambda)}(0)\ w^{(\lambda)}(1)]$ indicates an orthogonal sequence corresponding to a layer index $\lambda$. In particular, $w^{(\lambda)}(0)$ is a value applied to a first slot of the layer index $\lambda$ and $w^{(\lambda)}(1)$ is a value applied to a second slot of the layer index $\lambda$.

Table 7 indicates a cyclic shift field in DCI related to uplink and a corresponding relation between $n_{DMRS,\lambda}^{(2)}$ and $[w^{(\lambda)}(0) \cdot w^{(\lambda)}(1)]$.

TABLE 7

| Cyclic Shift Field in uplink-related DCI format [3] | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

In a $n_s$ slot, a cyclic shift value $\alpha_\lambda$ is defined by Formula 4 as follows and $n_{cs,\lambda}$ is defined by Formula 5 as follows.

$$\alpha_\lambda = 2\pi n_{cs,\lambda}/12 \quad \text{[Formula 4]}$$

$$n_{cs,\lambda} = (n_{DMRS}^{(1)} + n_{DMRS,\lambda}^{(2)} + n_{PN}(n_s)) \bmod 12 \quad \text{[Formula 5]}$$

$n_{DMRS}^{(1)}$ value is indicated by an upper layer parameter 'cyclicShift'.

Table 8 indicates a corresponding relation between the upper layer parameter 'cyclicShift' and the $n_{DMRS}^{(1)}$.

TABLE 8

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$n_{DMRS,\lambda}^{(2)}$ is determined by a cyclic shift value for a DMRS field in DCI, which is related to a most recent uplink for a transport block corresponding to PUSCH transmission. A value of $n_{DMRS,\lambda}^{(2)}$ is depicted in Table 7.

Referring back to Table 7, if a physical downlink control channel (PDCCH) including DCI related to uplink is not transmitted in a same transport block, if a first PUSCH is semi-persistently scheduled in a same transport block, or if a first PUSCH is scheduled by a random access response grant in a same transport block, it may have values shown in a first row of Table 7.

If there is no DCI related to uplink for a same transport block, it a first PUSCH for a same transport block is semi-statically scheduled, or if a first PUSCH for a same transport block is scheduled by a random access response, $n_{DMRS,\lambda}^{(2)}$ can be used to obtain $n_{DMRS,0}^{(2)}$ and $w^{(\lambda)}(m)$ value.

$n_{PN}(n_s)$ value can be defined by Formula 6 as follows.

$$n_{PN}(n_s) = \sum_{i=0}^{7} c(8 N_{symb}^{UL} \cdot n_s + i) \cdot 2^i \quad \text{[Formula 6]}$$

c(i) is a pseudo-random sequence and a cell-specific value. A pseudo-random sequence generator can be initialized in the beginning of a radio frame as $$c_{init} = \left\lfloor \frac{N_{ID}^{cell}}{30} \right\rfloor \cdot 2^5 + f_{ss}^{PUSCH}.$$

A precoding can be performed by Formula 7 as follows for a vector of a reference signal.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(v-1)} \end{bmatrix} \quad \text{[Formula 7]}$$

In this case, P is the number of antenna ports used to transmit PUSCH. In case of transmitting PUSCH using a single antenna port, P=1, W=1, and υ=1. In case of a spatial multiplexing, P=2 or P=4. A precoding matrix W can identically use a precoding matrix used for precoding PUSCH in a same subframe.

A physical mapping method for an uplink reference signal in PUSCH is explained in the following description.

For each antenna port used for transmitting PUSCH, $\tilde{r}_{PUSCH}^{(\tilde{p})}(\cdot)$ sequence is multiplied by an amplitude scaling factor $\beta_{PUSCH}$ and mapped in sequence from $\tilde{r}_{PUSCH}^{(\tilde{p})}(0)$. A physical resource block set used for a mapping process and a relation between an index $\tilde{p}$ and an antenna port number p are identical to that of a case of a corresponding PUSCH transmission. For a resource element (RE) having an index (k, l) where l=3 in case of a normal cyclic prefix or l=4 in case of an extended cyclic prefix, it is mapped in an order that k increases. Thereafter, it is mapped in an order that a slot number increases.

1. 3. 2. 2. Demodulation Reference Signal for PUCCH

A reference signal for PUCCH is determined as follows.

A reference signal sequence $\tilde{r}_{PUSCH}^{(\tilde{p})}(\cdot)$ for PUCCH is defined by Formula 8 as follows.

$$r_{PUCCH}^{(\tilde{p})}(m' N_{RS}^{PUCCH} M_{sc}^{RS} + m M_{sc}^{RS} + n) = \quad \text{[Formula 8]}$$

$$\frac{1}{\sqrt{P}} \bar{w}^{(\tilde{p})}(m) z(m) r_{u,v}^{(\alpha_{\tilde{p}})}(n)$$

In this case, each of $$m = 0, \ldots, N_{RS}^{PUCCH} - 1$$

$$n = 0, \ldots, M_{sc}^{RS} - 1$$

$$m' = 0, 1$$

is satisfied. P is the number of antenna ports used to transmit PUCCH. In case of a PUCCH format 2a and 2, z(m) corresponds to d(10) where m=1. Otherwise, z(m) corresponds to 1.

When $M_{sc}^{RS}$ corresponds to 12, $r_{u,v}^{(\alpha_{\tilde{p}})}(n)$ sequence represented by $\alpha_{\tilde{p}}$ is determined by a PUCCH format.

In case of a PUCCH format 1, 1a, and 1b, $\alpha_{\tilde{p}}(n_s, l)$ is defined by Formula 9 as follows.

$$\bar{n}_{oc}^{(\tilde{p})}(n_s) = \lfloor n'_{\tilde{p}}(n_s) \cdot \Delta_{shift}^{PUCCH} / N' \rfloor \quad \text{[Formula 9]}$$

$$\alpha_{\tilde{p}}(n_s, l) = 2\pi \cdot \bar{n}_{cs}^{(\tilde{p})}(n_s, l) / N_{sc}^{RB}$$

$$\bar{n}_{cs}^{(\tilde{p})}(n_s, l) = \begin{cases} [n_{cs}^{cell}(n_s, l) + (n'_{\tilde{p}}(n_s) \cdot \Delta_{shift}^{PUCCH} + \\ (\tilde{n}_{oc}^{(\tilde{p})}(n_s) \bmod \Delta_{shift}^{PUCCH})) \bmod N'] \bmod N_{sc}^{RB} \\ \text{for normal cyclic prefix} \\ [n_{cs}^{cell}(n_s, l) + (n'_{\tilde{p}}(n_s) \cdot \Delta_{shift}^{PUCCH} + \\ \tilde{n}_{oc}^{(\tilde{p})}(n_s)) \bmod N'] \bmod N_{sc}^{RB} \\ \text{for extended cyclic prefix} \end{cases}$$

In this case, $n'_{\tilde{p}}(n_s)$, N', $\Delta_{shift}^{PUCCH}$, and $n_{cs}^{cell}(n_s, l)$ are determined in advance. The number of reference signal symbols per slot $N_{RS}^{PUCCH}$ is shown in Table 9.

Table 9 shows the number of PUCCH demodulation reference symbols per slot.

TABLE 9

| PUCCH format | Normal cyclic prefix | Extended cyclic prefix |
|---|---|---|
| 1, 1a, 1b | 3 | 2 |
| 2, 3 | 2 | 1 |
| 2a, 2b | 2 | N/A |

Table 10 indicates an orthogonal sequence $[\overline{w}^{(\tilde{p})}(0) \ldots \overline{w}^{(\tilde{p})}(N_{RS}^{PUCCH}-1)]$ in the PUCCH format 1, 1a, and 1b.

TABLE 10

| Sequence index $\overline{n}_{oc}^{(\tilde{p})}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Table 11 indicates the orthogonal sequence $[\overline{w}^{(\tilde{p})}(0) \ldots \overline{w}^{(\tilde{p})}(N_{RS}^{PUCCH}-1)]$ PUCCH format 2, 2a, 2b, and 3.

TABLE 11

| Normal cyclic prefix | Extended cyclic prefix |
|---|---|
| [1 1] | [1] |

In case of a PUCCH format 3, $\alpha_{\tilde{p}}(n_s,l)$ is defined by Formula 10 as follows.

$$\alpha_{\tilde{p}}(n_s,l) = 2\pi \cdot n_{cs}^{(\tilde{p})}(n_s,l)/N_{sc}^{RB}$$

$$n_{cs}^{(\tilde{p})}(n_s,l) = (n_{cs}^{cell}(n_s,l) + n'_{\tilde{p}}(n_s)) \bmod N_{sc}^{RB} \quad \text{[Formula 10]}$$

In this case, $n'_{\tilde{p}}(n_s)$ is defined as Table 12. $n_{oc,0}^{(\tilde{p})}$ and $n_{oc,1}^{(\tilde{p})}$ correspond to a first slot and a second slot, respectively in a subframe.

Table 12 indicates a relation between $n_{oc}^{(\tilde{p})}$ and $n'_{\tilde{p}}(n_s)$ in the PUCCH format 3.

TABLE 12

| | $n_{\tilde{p}}'(n_s)$ | |
|---|---|---|
| $n_{oc}^{(\tilde{p})}$ | $N_{SF,1} = 5$ | $N_{SF,1} = 4$ |
| 0 | 0 | 0 |
| 1 | 3 | 3 |
| 2 | 6 | 6 |
| 3 | 8 | 9 |
| 4 | 10 | N/A |

A physical mapping method for an uplink reference signal in PUSCH is explained in the following description.

For each antenna port used for transmitting PUSCH, $\tilde{r}_{PUSCH}^{(\tilde{p})}(\cdot)$ sequence is multiplied by an amplitude scaling factor $\beta_{PUSCH}$ and mapped in sequence from $\tilde{r}_{PUSCH}^{(\tilde{p})}(0)$. For a resource element (RE) having an index (k, l), it is mapped in an order that k increases. Subsequently, it is mapped in an order that l increases. Lastly, it is mapped in an order that a slot number increases. A value of k and a relation between an index $\tilde{p}$ and an antenna port number p are identical to the values used for transmitting a corresponding PUSCH. A value of a symbol index l within a slot is shown in Table 13 as follows.

Table 13 indicates a position of a demodulation reference signal according to each of PUCCH formats.

TABLE 13

| | Set of values for l | |
|---|---|---|
| PUCCH format | Normal cyclic prefix | Extended cyclic prefix |
| 1, 1a, 1b | 2, 3, 4 | 2, 3 |
| 2, 3 | 1, 5 | 3 |
| 2a, 2b | 1, 5 | N/A |

1. 3. 2. 3. Sounding Reference Signal (SRS)

A sounding reference signal is determined as follows.

A sounding reference signal consists of a CAZAC (constant amplitude zero auto correlation) sequence. Sounding reference signals transmitted from a plurality of user equipments correspond to a CAZAC sequence ($r^{SRS}(n) = r_{u,v}^{(\alpha)}(n)$) including a cyclic shift value ($\alpha$) different from each other according to Formula 11 as follows. In this case, u is a PUCCH sequence group number and v is a basic sequence number.

$$\alpha_{\tilde{p}} = 2\pi \frac{n_{SRS}^{cs,\tilde{p}}}{8} \quad \text{[Formula 11]}$$

$$n_{SRS}^{cs,\tilde{p}} = \left(n_{SRS}^{cs} + \frac{8\tilde{p}}{N_{ap}}\right) \bmod 8$$

$$\tilde{p} \in \{0, 1, \ldots, N_{ap} - 1\}$$

In this case, $n_{SRS}^{cs}$ is a value set to each user equipment by an upper layer. Each configuration of a periodical sounding and a non-periodical sounding is determined by upper layer parameters 'cyclicShift' and 'cyclicShift-ap', respectively. The $n_{SRS}^{cs}$ has an integer value between 0 and 7. $N_{ap}$ is the number of antenna ports used to transmit an SRS.

A physical mapping method for a sounding reference signal is explained in the following description.

A sounding reference signal sequence is multiplied by an amplitude scaling factor $\beta_{PUSCH}$ to satisfy transmit power $P_{SRS}$. Thereafter, for an antenna port P, it is mapped to a resource element (RE) having an index (k, l) from $r_{SRS}^{(\tilde{p})}(0)$ by Formula 12 as follows.

$$a_{2k'+k_0^{(\tilde{p})},l}^{(\tilde{p})} = \begin{cases} \frac{1}{\sqrt{N_{ap}}} \beta_{SRS} r_{SRS}^{(\tilde{p})}(k') & k' = 0, 1, \ldots, M_{sc,b}^{RS} - 1 \\ 0 & \text{otherwise} \end{cases} \quad \text{[Formula 12]}$$

$N_{ap}$ is the number of antenna ports used to transmit a sounding reference signal. A set of the antenna ports used to transmit a sounding reference signal is independently determined for each configuration and interval of a non-periodical sounding. In this case, $k_0^{(\tilde{p})}$ indicates a start point of a frequency domain of a sounding reference signal. $M_{sc,b}^{RS}$ corresponds to a length, i.e., bandwidth, of a reference signal sequence represented by a subcarrier unit and it is defined by Formula 13 as follows.

$$M_{sc,b}^{RS} = m_{SRS,b} N_{sc}^{RB}/2 \quad \text{[Formula 13]}$$

In this case, as depicted in Table 14 to Table 17, $m_{SRS,b}$ is a value signaled from a base station according to an uplink bandwidth $N_{RB}^{UL}$.

It is necessary to have a cell-specific parameter $C_{SRS}$, which is an integer 0 to 7, and a UE-specific parameter $B_{SRS}$ which is an integer 0 to 3, to obtain the $m_{SRS,b}$. The $C_{SRS}$ is given by an upper layer cell-specific parameter 'srs-BandwidthConfig' and the $B_{SRS}$ is given by an upper layer UE-specific parameter 'srs-Bandwidth'.

In case that an uplink bandwidth corresponds to $6 \leq N_{RB}^{UL} \leq 40$, Table 14 indicates values of the $m_{SRS,b}$ and $N_b$ according to b=0, 1, 2, and 3.

TABLE 14

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

In case that an uplink bandwidth corresponds to $40 < N_{RB}^{UL} \leq 60$, Table 15 indicates values of the $m_{SRS,b}$ and $N_b$ according to b=0, 1, 2, and 3.

TABLE 15

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

In case that an uplink bandwidth corresponds to, $60 < N_{RB}^{UL} \leq 80$, Table 16 indicates values of the $m_{SRS,b}$ and $N_b$ according to b=0, 1, 2, and 3.

TABLE 16

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

In case that an uplink bandwidth corresponds to $80 < N_{RB}^{UL} \leq 110$, Table 17 indicates values of the $m_{SRS,b}$ and $N_b$ according to b=0, 1, 2, and 3.

TABLE 17

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In case of an UpPTS field, reconfiguration for $m_{SRS,0}$ can be activated by an upper layer cell-specific parameter 'srsMax-UpPts' by Formula 14 as follows.

$$m_{SRS,0}^{max} = \max_{c \in C}\{m_{SRS,0}^c\} \leq (N_{RB}^{UL} - 6N_{RA}) \quad \text{[Formula 14]}$$

On the contrary, if reconfiguration is deactivated, it corresponds to $m_{SRS,0}^{max} = m_{SRS,0}$. In this case, c is a configuration value for a frequency bandwidth of a sounding reference signal. As shown in Table 14 to Table 17, $C_{SRS}$ indicates a sounding reference signal configuration set according to each of the uplink bandwidths $N_{RB}^{UL}$. $N_{RA}$ is the number of physical random access channel format 4 included in the UpPTS.

In a frequency domain, a start point $k_0$ is defined by Formula 15 as follows.

$$k_0^{(p)} = \bar{k}_0^{(p)} + \sum_{b=0}^{B_{SRS}} 2M_{sc,b}^{RS} n_b \quad \text{[Formula 15]}$$

In this case, a normal uplink subframe $\bar{k}_0^{(p)}$ is defined by Formula 16 as follows.

$$\bar{k}_0^{(p)} = (\lfloor N_{RB}^{UL}/2 \rfloor - m_{SRS,0}/2)N_{sc}^{RB} + k_{TC}^{(p)} \quad \text{[Formula 16]}$$

And, for the UpPTS, $\bar{k}_0^{(p)}$ is defined by Formula 17 as follows.

$$\bar{k}_0^{(p)} = \begin{cases} (N_{RB}^{UL} - m_{SRS,0}^{max})N_{sc}^{RB} + k_{TC}^{(p)} \\ \quad \text{if } ((n_f \bmod 2) \cdot (2 - N_{SP}) + n_{hf}) \bmod 2 = 0 \\ k_{TC}^{(p)} \\ \quad \text{otherwise} \end{cases} \quad \text{[Formula 17]}$$

A $k_{TC}^{(p)} \in \{0,1\}$ value is defined by Formula 18 as follows.

$$k_{TC}^{(p)} = \begin{cases} 1 - \bar{k}_{TC} & \text{if } n_{SRS}^{cs,\tilde{p}} \in \{4, 5, 6, 7\} \text{ and } \tilde{p} \in \{1, 3\} \\ & \text{and four antenna ports are} \\ & \text{used for SRS transmission} \\ \bar{k}_{TC} & \text{otherwise} \end{cases} \quad \text{[Formula 18]}$$

In this case, an interval of the $k_{TC}^{(p)} \in \{0,1\}$ value is determined by an upper layer UE-specific parameter 'transmissionComb' and each configuration of a non-periodical transmission is determined by 'transmissionComb-ap'. $n_b$ indicates an interval position index. A variable $n_{hf}$ has a value of 0 for the UpPTS in a first half frame of a radio frame and has a value of 1 for the UpPTS in a second half frame.

A frequency hopping of a sounding reference signal is configured by a parameter $b_{hop}$ having a value of 0 to 3 given by an upper layer parameter 'srs-HoppingBandwidth'.

If a frequency hopping of a sounding reference signal is deactivated, in particular, if it is corresponds to $b_{hop} \geq B_{SRS}$, the frequency position index $n_b$ has a constant value as shown in Formula 19 unless it is reconfigured. In this case, an interval of $n_{RRC}$ is determined by an upper layer parameter 'freqDomainPosition' and each configuration of a non-periodical transmission is determined by 'freqDomainPosition-ap'.

$$n_b = \lfloor 4n_{RRC}/m_{SRS,b} \rfloor \mod N_b \qquad \text{[Formula 19]}$$

On the contrary, if a frequency hopping of a sounding reference signal is activated, in particular, if it corresponds to $b_{hop} < B_{SRS}$, the frequency position index $n_b$ is defined by Formula 20 and Formula 21 as follow.

$$n_b = \begin{cases} \lfloor 4n_{RRC}/m_{SRS,b} \rfloor \mod N_b & b \leq b_{hop} \\ \{F_b(n_{SRS}) + \lfloor 4n_{RRC}/m_{SRS,b} \rfloor\} \mod N_b & \text{otherwise} \end{cases} \qquad \text{[Formula 20]}$$

In this case, $N_b$ is given by Table 14 to Table 17 according to each of the UP frequency bandwidths $N_{RB}^{UL}$.

$$F_b(n_{SRS}) = \begin{cases} (N_b/2) \left\lfloor \frac{n_{SRS} \mod \prod_{b'=b_{hop}}^{b} N_{b'}}{\prod_{b'=b_{hop}}^{b-1} N_{b'}} \right\rfloor + \left\lfloor \frac{n_{SRS} \mod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases} \qquad \text{[Formula 21]}$$

In this case, $N_{b_{hop}}$ is 1 irrespective of the $N_b$ value according to Table 14 to Table 17.

$n_{SRS}$ is a parameter used to calculate the count of transmitting a UE-specific sounding reference signal and determined by Formula 22 as follows.

$$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases} \qquad \text{[Formula 22]}$$

In this case, $T_{SRS}$ is an interval for transmitting a UE-specific sounding reference signal. $T_{offset}$ is an offset of a sounding reference signal subframe and $T_{offset\_max}$ is a maximum value of an offset of a sounding reference signal subframe.

In case of all subframes except a special subframe, a sounding reference signal is transmitted on a last symbol of a subframe.

A subframe configuration to transmit a sounding reference signal is explained in the following description.

Both a cell-specific subframe configuration interval $T_{SFC}$ and a cell-specific subframe offset $\Delta_{SFC}$ to transmit a sounding reference signal are indicated in Table 18 and Table 19 according to a frame structure type 1 and type 2, respectively.

In this case, 'srs-SubframeConfig' parameter is given by an upper layer signaling. Sounding reference signal subframes satisfy $\lfloor n_s/2 \rfloor \mod T_{SFC} \in \Delta_{SFC}$. In case of the type 2 frame structure, a sounding reference signal is transmitted via a configured uplink subframe or the UpPTS only.

Table 18 indicates a configuration of a sounding reference signal in the type 1 frame structure.

TABLE 18

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 19 indicates a configuration of a sounding reference signal in the type 2 frame structure.

TABLE 19

| srs-SubframeConfig | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

1. 4. Carrier Aggregation Environment 1. 4. 1. The General of Carrier Aggregation Communication environments taken into consideration by embodiments of the present invention include a multicarrier supportive environment. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be set to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20}MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in all the serving cells.

Serving cell (e.g., PCell, SCell) may be configured via RRC parameters. In particular, PhysCellId is a physical layer identifier and has an integer value ranging 0 to 503. SCellIndex is a short identifier used to identify SCell and has an integer value ranging 1 to 7. ServeCellIndex is a short identifier used to identify a serving cell (e.g., PCell, SCell) and has a value ranging 0 to 7. A value of 0 is applied to PCell and ScellIndex is previously given to be applied to SCell. In particular, a cell having a smallest cell ID (or a smallest cell index) in ServCellIndex becomes PCell.

The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. In particular, a user equipment is able to perform a transmission by receiving assignment of PUCCH in its PCell only and is able to use the PCell only in obtaining system information or changing a monitoring procedure. E-UTRAN (evolved universal terrestrial radio access) may change PCell only for a handover procedure in a manner of sending a user equipment supportive of carrier aggregation environment an RRC connection reconfiguration (RRCConnectionReconfiguration) message of an upper layer, which contains mobility control information (mobilityControlInfo).

The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an addition radio resource. PUCCH does not exist in the rest of cells (i.e., SCell) except PCell in the serving cell configured in the carrier aggregation environment. When E-UTRAN adds SCell to a user equipment supportive of a carrier aggregation environment, it may be able to provide all system information related to an operation of a related cell in RRC_CONNECTED state via a dedicated signal. A change of system information may be controlled by a release and addition of a related SCell. In doing so, it may be able to use an RRC connection reconfiguration (RRCConnectionReconfiguration) message of an upper layer. E-UTRAN may perform a dedicated signaling having a parameter differing per user equipment rather than broadcasting in a related SCell.

After an initial security activating process has started, E-UTRAN may be able to configure a network including at least one SCell in addition to PCell configured in the early stage of a connection establishment process. In a carrier aggregation environment, PCell or SCell may be able to work as a component carrier. In the following description of embodiments, a primary component carrier (PCC) may be usable as having the same meaning of PCell and a secondary component carrier (SCC) may be usable as having the same meaning of SCell.

Figure 10:
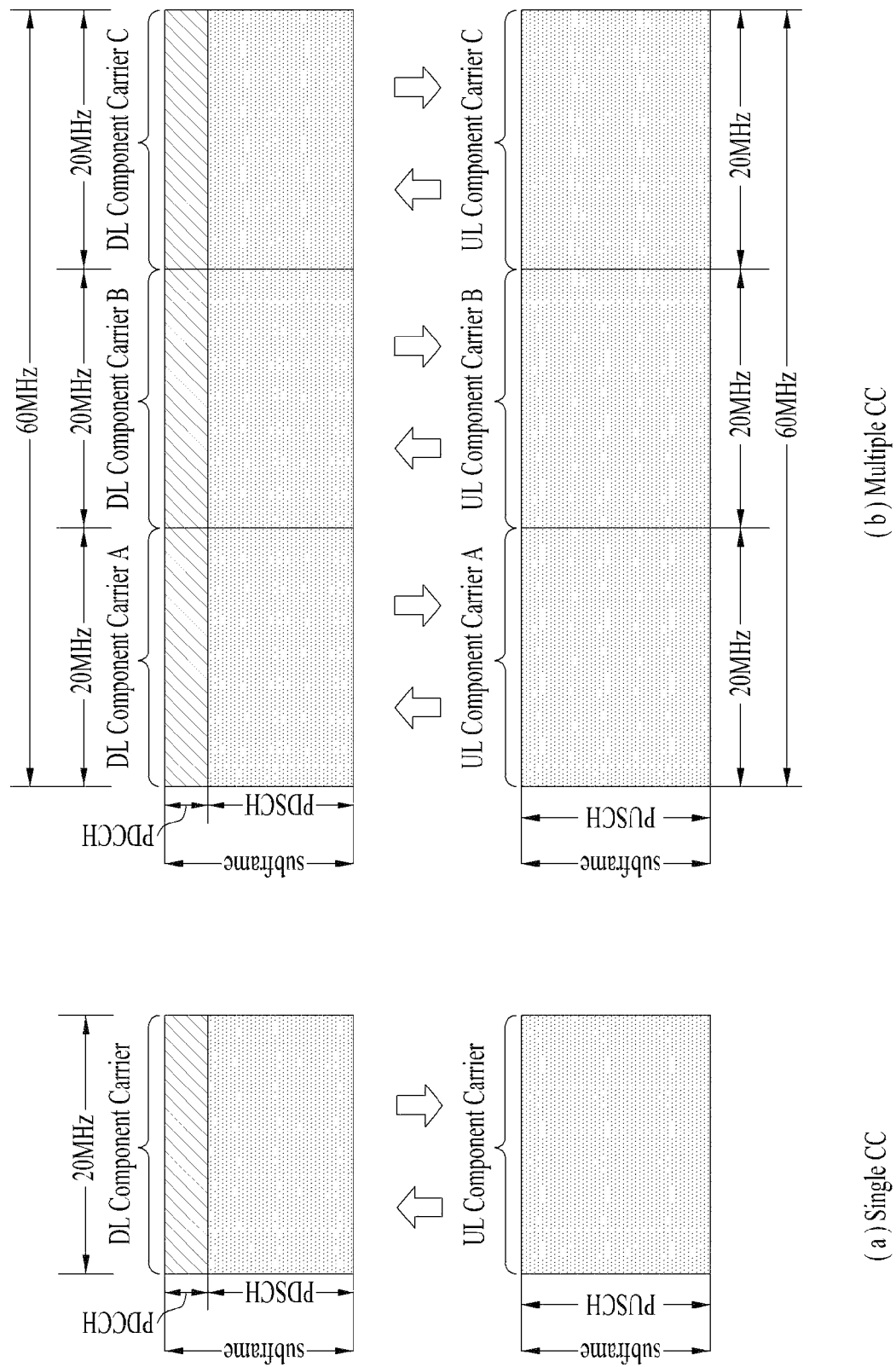
FIG. 10 is a diagram for one example of component carriers of LTE system and carrier aggregation used by LTE-A system.

FIG. 10 is a diagram for one example of component carriers of LTE system and carrier aggregation used by LTE-A system.

FIG. 10 (a) shows a single carrier structure used by LTE system. Component carriers include DL CC and UL CC. One component carrier may have a frequency range of 20 MHz.

FIG. 10 (B) shows a carrier aggregation structure used by LTE-A system. Referring to FIG. 6 (b), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, M≤N) to a user equipment. In doing so, the user equipment may be able to monitor the limited M DL CCs only and receive DL signals. Moreover, a network may be able to assign primary DL CC to the user equipment in a manner of prioritizing L DL CCs (where, L≤M≤N). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such an upper layer message as an RRC message or a system information. For instance, by a linkage defined by SIB2 (system information block type 2), a combination of DL and UL resources may be configured. In particular, a linkage may mean a mapping relation between a DL CC for transmitting PDCCH carrying a UL grant and a UL CC using the UL grant or a mapping relation between a DL/UL CC for carrying HARQ data and a UL/DL CC for carrying HARQ ACK/NACK signal.

1. 4. 2. Cross Carrier Scheduling

In a carrier aggregation system, a self-scheduling method and a cross carrier scheduling method exist in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having carried the UL grant.

Whether to perform a cross carrier scheduling may be UE-specifically activated or deactivated and may be notified to each user equipment semi-statically via an upper layer signaling (e.g., RRC signaling).

In case that the cross carrier scheduling is activated, PDCCH needs a carrier field indicator (CIF) that indicates that PDSCH/PUSCH indicated by the corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, CIF is not configured. In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL C set, the UE UL CC set and the PDCCH monitoring set may be configured UE-specifically, UE group-specifically or cell-specifically.

In case that the cross carrier scheduling is deactivated, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

Figure 11:
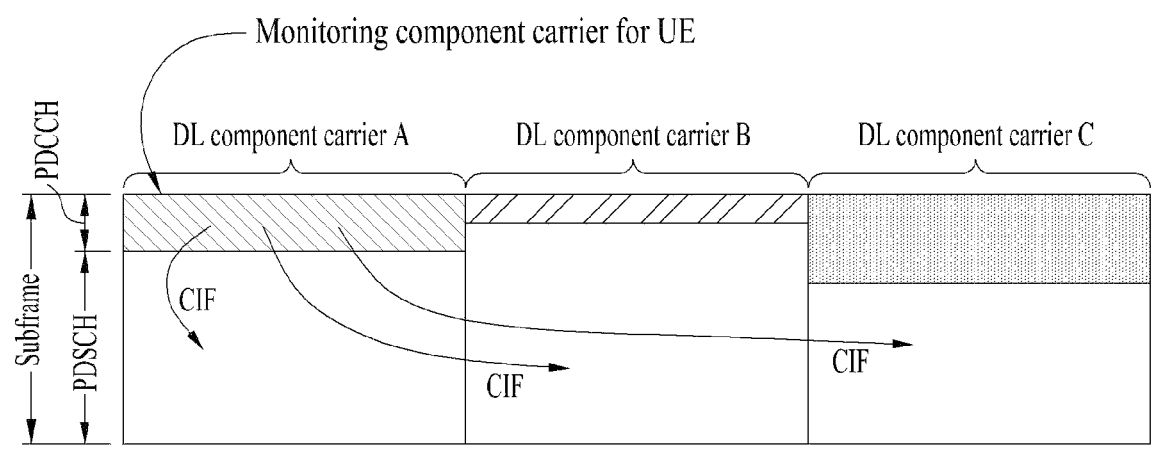
FIG. 11 is a diagram for a subframe structure of LTE-A system in accordance with cross carrier scheduling.

FIG. 11 is a diagram for a subframe structure of LTE-A system in accordance with cross carrier scheduling.

Referring to FIG. 11, a DL subframe for an LTE-A user equipment represents a case that 3 DL CCs are combined and that DL CC 'A' is set as a PDCCH monitoring DL CC. If CIF is not used, each DL CC may be able to transmit a PDCCH for scheduling its PDSCH without the CIF. On the other hand, if a CIF is used via an upper layer signaling, the only DL CC 'A' is able to transmit its PDSCH or a PDCCH for scheduling a PDSCH of another CC using the CIF. In doing so, DL CC 'B' or DL CC 'C', which is not set as the PDCCH monitoring DL CC, does not transmit PDCCH.

2. Method of Transmitting Uplink Reference Signal

When a UE moves fast, Doppler spread significantly works. The Doppler spread causes the spread in frequency domain. Consequently, distortion of a signal occurs due to the Doppler spread. The Doppler spread can be represented by Formula 23 as follows.

$$f_{doppler} = (v/\lambda)\cos\theta \quad \text{[Formula 23]}$$

In this case, $v$ means moving speed of a UE and $\lambda$ means a center frequency wavelength of a radio wave transmitted by a base station or a UE. And, $\theta$ means an angle between a reception radio wave and a moving direction of a UE. In the present specification, for clarity, assume that $\theta$ value corresponds to 0, by which the present invention may be non-limited.

In this case, coherence time ($T_c$) has a relation of $$T_c \approx \frac{1}{f_{doppler}}.$$

If a correlation value of a channel response is defined as the coherence time of time space more than 50% in time domain, it can be represented as $$T_c \approx \frac{9}{16\pi f_{doppler}}.$$

In a wireless communication system, a relation between the coherence time and the Doppler spread can be defined by Formula 24 as follows using a geometric mean of the aforementioned two Formulae.

$$T_c = \sqrt{\frac{9}{16\pi f_{doppler}}} = \frac{0.423}{f_{doppler}} \quad \text{[Formula 24]}$$

In a wireless communication system, a space between reference signals (or pilot signals) is designed to be inserted during the coherence time to secure channel estimation performance. In particular, if a space between reference signals corresponds to $T_s$, the space is designed to satisfy Formula 25 as follows.

$$T_s < T_c \quad \text{[Formula 25]}$$

As mentioned in the foregoing description, in order to calculate a channel response in time and frequency domain in LTE/LTE-A system, a reference signal (RS) known to both a transmitting side and a receiving side is used. Regarding the reference signal, the reference signal in downlink consists of a cell-specific reference signal (CRS), a dedicated reference signal (DRS), and a CSI-RS. The cell-specific reference signal is used to estimate frequency and time domain attribute of a channel. To this end, a UE may operate a channel equalizer. The dedicated reference signal is transmitted in a form of being precoded in a reference signal for beamforming in a specific transmission mode and a UE estimates a channel without information on a precoding matrix and may operate an equalizer. The CSI-RS is a reference signal used to measure quality of a channel received by each antenna in a transmission mode 9.

And, in case of an uplink, a UE transmits an uplink SC-FDMA symbol in a manner of inserting a demodulation reference signal into the uplink SC-FDMA symbol and a base station can perform channel estimation on PUSCH transmitted by the UE. In this case, if MIMO transmission is configured, a precoding matrix used for the PUSCH for the MIMO transmission is identically applied to the demodulation reference signal. By doing so, the base station can perform a channel estimation without information on the precoding matrix. Hence, the estimated channel has a form that a channel H of which a signal actually transmitted by the UE has undergone multiplied by a precoding matrix W, i.e., H·W form. The estimated channel is commonly called an equivalent channel and may operate a PUSCH channel equalizer. Yet, as mentioned in the foregoing description, in an environment where a UE moves fast, coherence time is shortened compared to an environment where a UE moves at a low speed. And to make it worse, if a demodulation signal is used only since the coherence time becomes shorter than a transmission period of a demodulation reference signal, performance of channel estimation cannot be secured. Hence, in the environment where a UE move fast, an additional channel estimation scheme or a scheme of transmitting a demodulation reference signal in a manner of shortening the transmission period of the demodulation reference signal is required.

In case of PUCCH, a demodulation reference signal is differently transmitted depending on each PUCCH format, a normal cyclic prefix, or an extended cyclic prefix.

Table 20 indicates a symbol index to which a demodulation reference signal is transmitted in each PUCCH format.

TABLE 20

| PUCCH format | Set of values for l | |
|---|---|---|
| | Normal cyclic prefix | Extended cyclic prefix |
| 1, 1a, 1b | 2, 3, 4 | 2, 3 |
| 2, 3 | 1, 5 | 3 |
| 2a, 2b | 1, 5 | N/A |

In the following description, a reference signal transmitted in uplink is compared with a reference signal transmitted in downlink.

Figure 12:
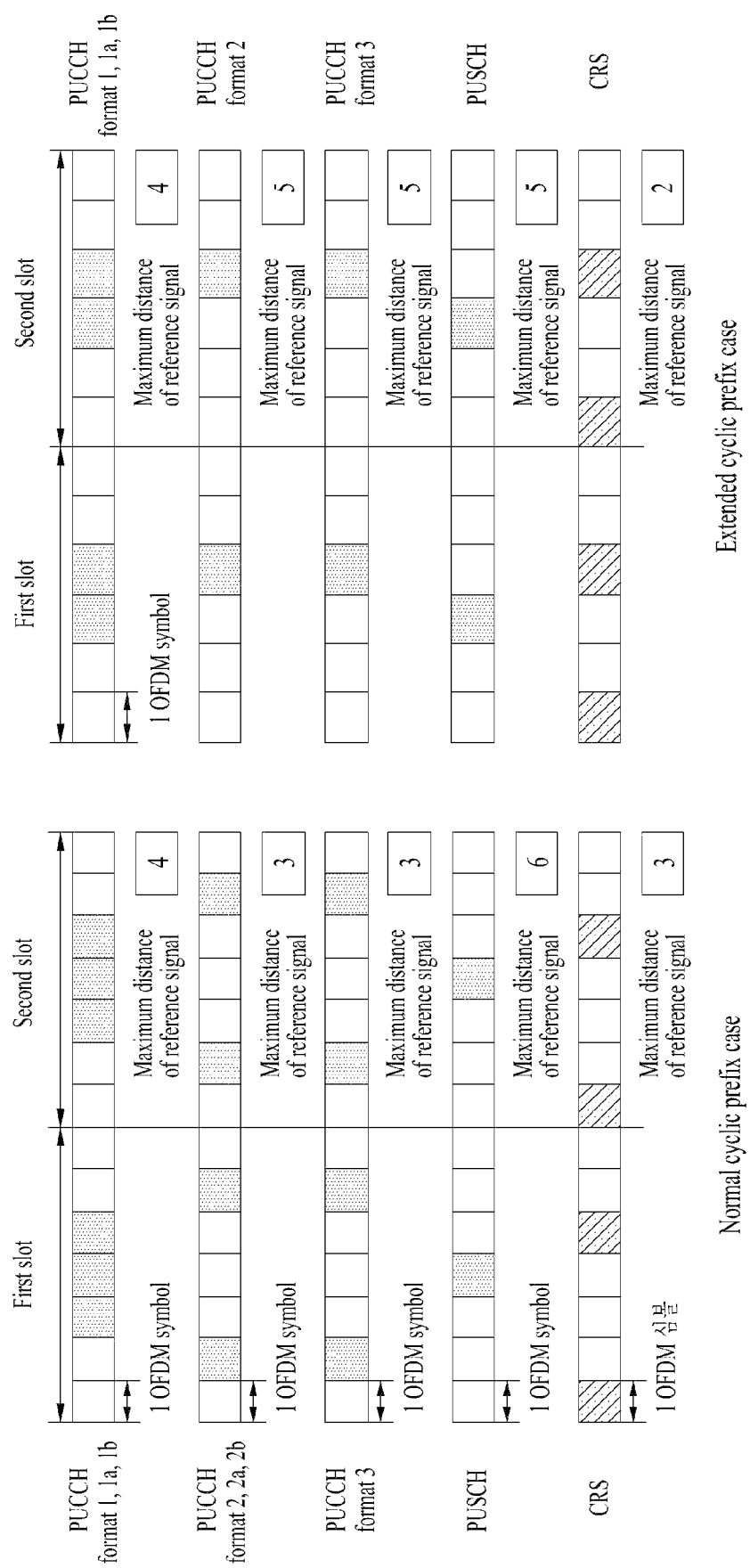
FIG. 12 is a diagram for an example of uplink/downlink reference signals transmitted in a subframe.

FIG. 12 is a diagram for an example of uplink/downlink reference signals transmitted in a subframe.

Referring to FIG. 12, a maximum distance of a reference signal means the maximum number of OFDM symbols where a reference signal is not transmitted in a subframe. In other word, the maximum distance means the number of contiguous maximum OFDM symbols between the OFDM symbols on which a reference signal is transmitted. The maximum distance of the reference signal varies depending on a normal cyclic prefix and an extended cyclic prefix. And, in case of uplink, a position to which a demodulation reference signal for PUSCH is transmitted and a position to which a demodulation reference signal for PUCCH is transmitted are different from each other. As depicted in Table 20, a position to which the demodulation reference signal for PUCCH is transmitted varies depending on each of the PUCCH format. When the maximum distance of the reference signal transmitted in uplink is compared with the maximum distance of the reference signal transmitted in downlink, the maximum distance of the demodulation reference signal used in uplink has a relatively greater value compared to the maximum distance of the cell-specific reference signal used in downlink. Hence, if the coherence time is less than the maximum distance of the reference signal, performance of channel estimation is degraded and this makes an error floor. Consequently, a signal transmitted by a UE cannot be properly decoded by a base station. In particular, this sort of problem may significantly affect the demodulation reference signal, which has the maximum distance value of the reference signal corresponding to 6, used for PUSCH of a normal cyclic prefix.

For instance, in a LTE/LTE-A system, a normal cyclic prefix OFDM symbol has a length of 7.1875e-005 s in a subframe in case of a first OFDM symbol. In case of a second to fourteenth OFDM symbol, the OFDM symbols have a length of 7.1354e-005 s. In case of an extended cyclic prefix, all OFDM symbols (first to twelfth) in a subframe have a length of 8.3333e-005 s. In this case, although the OFDM symbol indicates an OFDM symbol in downlink, SC-FDMA symbol in uplink has a same duration as well. In the present specification, for clarity, the OFDM symbol and the SC-FDMA symbol are commonly called the OFDM symbol without distinction.

A coherence time of a DMRS used for PUSCH should be secured for a transmission period considering that the duration of the OFDM symbol in case of the normal cyclic prefix corresponds to 7.1354e-5. Hence, since the maximum distance of the reference signal corresponds to 6, the transmission period of the DMRS corresponds to 4.2812e-004. Hence, a criterion of maintaining the coherence time during the DMRS transmission period is determined, a Doppler spread frequency can be calculated using the aforementioned Formula 23 and 24, and a permissible speed of a UE making the coherence time to be maintained can be induced. This can be defined by Formula 25 and 26 as follow. (As mentioned in the foregoing description, assume that θ value corresponds to 0.)

$$T_c = \frac{0.423 \cdot \lambda}{v} \quad \text{[Formula 25]}$$

$$v = \frac{0.423 \cdot \lambda}{T_c} \quad \text{[Formula 26]}$$

In Formula 25 and 26, if it is assumed that $T_c$ is 4.2812e-4 and a center frequency of a radio wave transmitted by a base station is 2 GHz, a wavelength $\lambda$ is given by $C/f_{center}=(3 \cdot 10^8)/(2 \cdot 10^9)=0.15$ m. Hence, in case that the maximum distance of a reference signal corresponds to 6, the maximum speed of a UE to maintain the coherence time is 148.2061 m/s=533.542 km/h. Yet, due to an actual quantization error or performance itself of a channel estimation algorithm, if the channel estimation performance implemented by a UE or the coherence time is regulated by 90% value, it may requires less value compared to the aforementioned maximum speed and this works as a limit condition for mobility of the UE. Hence, the present specification proposes a scheme of securing the channel estimation performance of the fast-moving UE to overcome the limit condition.

The proposed scheme inserts an additional reference signal to enable a transmission period of a reference signal to be included in a coherence time duration and proposes an orthogonal cover code (OCC) to maintain orthogonality between reference signals.

Figure 13:
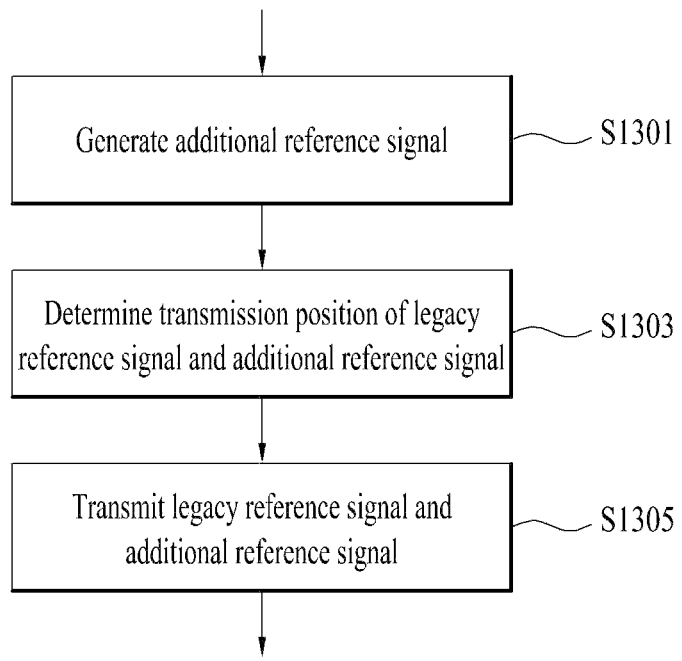
FIG. 13 is a flowchart for a method of transmitting an uplink reference signal according to one embodiment of the present invention.

FIG. 13 is a flowchart for a method of transmitting an uplink reference signal according to one embodiment of the present invention.

Referring to FIG. 13, a UE generates an additional reference signal transmitted together with a legacy demodulation reference signal in order for a base station to perform a precise channel estimation or compensation for the UE. In particular, in order to transmit reference signals the number of which is greater than the number of demodulation reference signals transmitted in one subframe, the UE generates demodulation reference signal suitable for the additional reference signal [S1301]. The UE can generate the additional reference signal identically using a method of generating the legacy demodulation reference signal. And, the UE may generate a demodulation reference signal using a new method due to the additional reference signal. In particular, a cyclic shift value configured to apply a cyclic shift different from each other according to each of demodulation reference signal sequences including a newly added reference signal to reduce interference and increase channel estimation performance is newly configured. Or, an orthogonal cover code applied to the reference signal sequences can be newly defined. And, having detected a moving speed of the UE, the UE can generate and add a new reference signal to the legacy reference signal when the moving speed of the UE exceeds a speed of a threshold value only. In the following description, a method of determining a cyclic shift value and a method of newly defining an orthogonal cover code are explained in detail in (2. 2.).

Having generated the additional reference signal, the UE determines a transmission position of the reference signal added within a subframe together with the legacy reference signal. In particular, having generated a demodulation reference signal including the added reference signal, the UE determines a position in which the demodulation reference signal is transmitted in a subframe [S1303]. Subsequently, the UE transmits the newly added reference signal to the base station together with the legacy reference signal [S1305].

As mentioned in the foregoing description, by transmitting the newly added reference signal in addition to the legacy demodulation reference signal, an effect of transmitting more reference signals in time domain can be obtained. This also can obtain an effect of shortening a space of a reference signal used for channel estimation compared to a coherence time. Hence, the base station can perform a precise channel information estimation or compensation for a fast-moving UE and this may make an efficient rank adaptation to be enabled. The position to which the demodulation reference signal is transmitted is explained in detail in the following description (2. 1.).

In the following description, a scheme for the UE to generate an uplink reference signal and a scheme of transmitting the uplink reference signal to the base station are explained in detail. For clarity, the proposed scheme is explained under an assumption of PUSCH of a normal cyclic prefix. Yet, the scheme can also be applied to each of the PUCCH formats in the normal cyclic prefix or the extended cyclic prefix. Moreover, it is apparent that the scheme can be applied to PUSCH in the extended cyclic prefix as well.

2. 1. Determining Transmission Position of Uplink Reference Signal

In order to maintain a transmission space of a reference signal, which is shorter than a coherence time, a demodulation reference signal can be transmitted in a manner of inserting an additional reference signal into the demodulation reference signal. In this case, a structure of a subframe transmitted in a manner of being inserted by the additional reference signal can be represented as follows.

Figure 14:
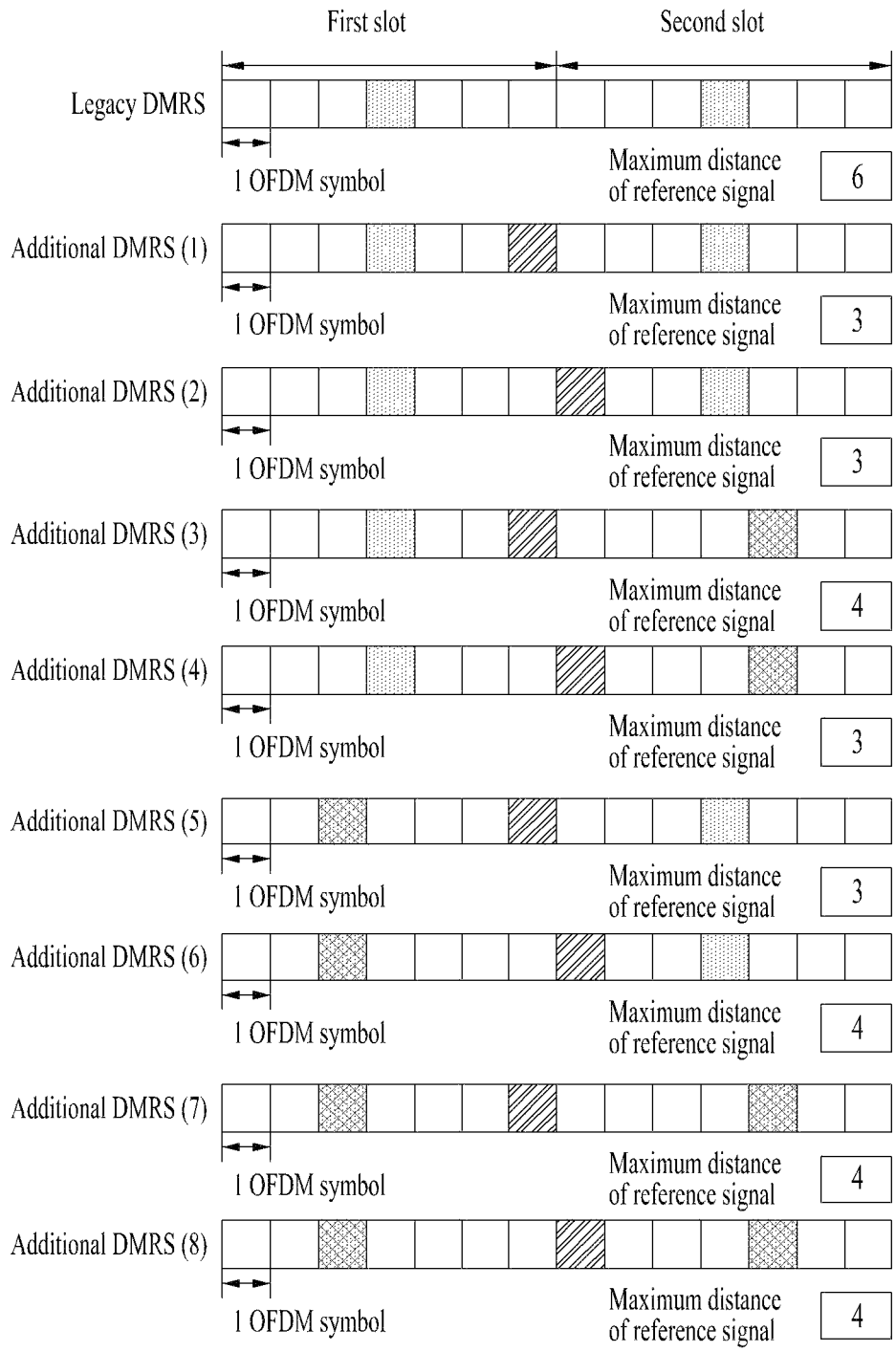
FIG. 14 is a diagram for an example of inserting an additional reference signal according to one embodiment of the present invention.

FIG. 14 is a diagram for an example of inserting an additional reference signal according to one embodiment of the present invention.

Referring to FIG. 14, in contrast with a position in which a legacy demodulation reference signal is transmitted, in case that an additional reference signal is inserted, a transmission position of a legacy demodulation reference signal and a transmission position of the additional reference signal are depicted in FIG. 14.

In FIG. 14, cases of additional reference signals (1) and (2) show an example that a position of a legacy demodulation reference signal is fixed and the additional reference signal is positioned at a last symbol of a first slot or is positioned at a first symbol of a second slot. If the additional reference signal is transmitted using the aforementioned way, a maximum distance between reference signals can be reduced from 6 to 3.

And, in case of an additional reference signal (3) and (4), a position of the additional reference signal is identical to that of the aforementioned (1) and (2) and a position of the demodulation reference signal transmitted in a first slot is maintained identically to the legacy position. Yet, (3) and (4) show an example that a position of the demodulation reference signal transmitted in a second slot is transmitted on a next symbol. If the additional reference signal is transmitted using the aforementioned way, a maximum distance between reference signals can be reduced from 6 to 4 or 3.

And, in case of an additional reference signal (5) and (6), a position of the additional reference signal is identical to that of the aforementioned (1) and (2) and a position of the demodulation reference signal transmitted in a second slot is maintained identically to the legacy position. Yet, (3) and (4) show an example that a position of the demodulation reference signal transmitted in a first slot is transmitted on a previous symbol. If the additional reference signal is transmitted using the aforementioned way, a maximum distance between reference signals can be reduced from 6 to 4 or 3.

And, in case of an additional reference signal (7) and (8), a position of the additional reference signal is identical to that of the aforementioned (1) and (2). Yet, (7) and (8) show an example that a position of the demodulation reference signal transmitted in a first slot is transmitted on a previous symbol and a position of the demodulation reference signal transmitted in a second slot is transmitted on a next symbol. If the additional reference signal is transmitted using the aforementioned way, a maximum distance between reference signals can be reduced from 6 to 4.

2. 2. Uplink Reference Signal Generation 2. 2. 1. Cyclic Shift

In order to generate a demodulation reference signal, which is newly inserted together with a legacy uplink reference signal, a Zadoff-chu (ZC) sequence, which is used for a legacy demodulation reference signal, can be identically used. In this case, a Formula to generate the ZC sequence can be generated identically using the Formula (e.g., 5. 5. 1. Formula in 'reference signal sequence generation' of 3GPP TS 36.211 v10. 2. 0) used in a legacy LTE/LTE-A system.

In order to use the above-mentioned generated reference signal sequence as a demodulation reference signal, Formula 27 can be used. In the following description, λ does not mean a wavelength. Instead, the λ means a layer number.

In relation to a layer index $\lambda \in \{0, 1, \ldots, \upsilon-1\}$, a PUSCH demodulation reference signal sequence $r_{PUSCH}^{(\lambda)}(\cdot)$ is defined by Formula 27 as follows.

$$r_{PUSCH}^{(\lambda)}(m \cdot M_{sc}^{RS}+n) = w^{(\lambda)}(m) r_{u,v}^{(\alpha_\lambda)}(n)$$ [Formula 27]

In this case, m and n satisfy $$m = 0, 1$$
$$n = 0, \ldots, M_{sc}^{RS} - 1$$

and $M_{sc}^{RS} = M_{sc}^{PUSCH}$. And, as mentioned in the foregoing description, $r_{u,v}^{(\alpha_\lambda)}(0), \ldots, r_{u,v}^{(\alpha_\lambda)}(M_{sc}^{RS}-1)$ can be defined identical to the legacy LTE/LTE-A system (e.g., 5. 5. 1 of 3GPP TS 36. 211). An orthogonal sequence $w^{(\lambda)}(m)$ is set to $[w^\lambda(0)\ w^\lambda(1)\ w^\lambda(2)] = [1\ 1\ 1]$ for a DCI format 0 when an upper layer parameter 'Activate-DMRS-with OCC' is not set or a temporary C-RNTI is used to transmit DCI, which is related to most recent uplink for a transport block related to corresponding PUSCH transmission. In this case, the $[w^\lambda(0)\ w^\lambda(1)\ w^\lambda(2)]$ corresponds to a layer index λ and indicates an orthogonal sequence applied to a plurality of reference signals. Otherwise, the orthogonal sequence can be configured by Table 21 as follows according to a cyclic shift field included in the DCI, which is related to the most recent uplink for the transport block related to the corresponding PUSCH transmission.

Table 21 indicates a mapping relation between the cyclic shift field in the uplink-related DCI format and $n_{DMRS,\lambda}^{(2)}$ and a mapping relation between the cyclic shift field in the uplink related DCI format and $[w^\lambda(0)\ w^\lambda(1)\ w^\lambda(2)]$

TABLE 21

| Cyclic Shift Field in uplink-related DCI format [3] | $n_{DMRS,\lambda}^{(2)}$ | | | | $[w^\lambda(0)\ w^\lambda(1)\ w^\lambda(2)]$ | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1 1] | [1 1 1] | [1 $e^{j2\pi 3}\ e^{j4\pi 3}$] | [1 $e^{j4\pi 3}\ e^{j2\pi 3}$] |
| 001 | 6 | 0 | 9 | 3 | [1 $e^{j2\pi 3}\ e^{j4\pi 3}$] | [1 $e^{j4\pi 3}\ e^{j2\pi 3}$] | [1 1 1] | [1 1 1] |
| 010 | 3 | 9 | 6 | 0 | [1 $e^{j2\pi 3}\ e^{j4\pi 3}$] | [1 $e^{j4\pi 3}\ e^{j2\pi 3}$] | [1 1 1] | [1 1 1] |
| 011 | 4 | 10 | 7 | 1 | [1 1 1] | [1 1 1] | [1 1 1] | [1 1 1] |
| 100 | 2 | 8 | 5 | 11 | [1 1 1] | [1 1 1] | [1 1 1] | [1 1 1] |
| 101 | 8 | 2 | 11 | 5 | [1 $e^{j2\pi 3}\ e^{j4\pi 3}$] | [1 $e^{j2\pi 3}\ e^{j4\pi 3}$] | [1 $e^{j4\pi 3}\ e^{j2\pi 3}$] | [1 $e^{j4\pi 3}\ e^{j2\pi 3}$] |
| 110 | 10 | 4 | 1 | 7 | [1 $e^{j2\pi 3}\ e^{j4\pi 3}$] | [1 $e^{j2\pi 3}\ e^{j4\pi 3}$] | [1 $e^{j4\pi 3}\ e^{j2\pi 3}$] | [1 $e^{j4\pi 3}\ e^{j2\pi 3}$] |
| 111 | 9 | 3 | 0 | 6 | [1 1 1] | [1 1 1] | [1 $e^{j2\pi 3}\ e^{j4\pi 3}$] | [1 $e^{j4\pi 3}\ e^{j2\pi 3}$] |

In a $n_s$ slot, a cyclic shift $\alpha_\lambda$ is defined by Formula 28 as follows and $n_{cs,\lambda}$ can be defined by Formula 29 as follows.

$$\alpha_\lambda = 2\pi n_{cs,\lambda}/12$$ [Formula 28]

$$n_{cs,\lambda} = (n_{DMRS}^{(1)} + n_{DMRS,\lambda}^{(2)} + n_{PN}(n_s)) \bmod 12$$ [Formula 29]

In this case, $n_{DMRS}^{(1)}$ and $n_{DMRS,\lambda}^{(2)}$ value can be determined by receiving them from a base station or may be predetermined between the base station and a UE.

For instance, the $n_{DMRS}^{(1)}$ value can be determined by Table 22 as follows according to an upper layer parameter 'cyclicShift'. Yet, this is just an example only. The $n_{DMRS}^{(1)}$ value can vary depending on a parameter.

Table 22 exemplifies a mapping relation between an upper layer parameter 'cyclicShift' and the $n_{DMRS}^{(1)}$.

TABLE 22

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

And, the $n_{DMRS,\lambda}^{(2)}$ can be determined by a cyclic shift value for a DMRS field within DCI, which is related to a most recent uplink for a transport block related to corresponding PUSCH transmission. The $n_{DMRS,\lambda}^{(2)}$ value is determined like the aforementioned Table 21.

If there does not exist uplink-related DCI for a same transport block related to the corresponding PUSCH transmission and first PUSCH for the same transport block is semi-persistently scheduled or if the first PUSCH for the same transport block is scheduled by a random access response grant, $n_{DMRS,0}^{(2)}$ and $w^{(\lambda)}(m)$ value may have values shown in a first row of the aforementioned Table 21.

$n_{PN}(n_s)$ value can be defined by Formula 30 as follows.

$$n_{PN}(n_s) = \sum_{i=0}^{7} c(8N_{symb}^{UL} \cdot n_s + i) \cdot 2^i$$ [Formula 30]

C(i) is a pseudo-random sequence and a cell-specific value. A pseudo-random sequence generator can be initialized to $$c_{init} = \left\lfloor \frac{N_{ID}^{cell}}{30} \right\rfloor \cdot 2^5 + f_{ss}^{PUSCH}$$

in a start point of each radio frame.

A vector of a reference signal can be precoded by Formula 31 as follows.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(\upsilon-1)} \end{bmatrix} \quad \text{[Formula 31]}$$

In this case, P is the number of antenna ports used to transmit PUSCH. In case of transmitting PUSCH using a single antenna port, P=1, W=1, and υ=1. In case of a spatial multiplexing, P=2 or P=4. A precoding matrix W can identically use a precoding matrix used for precoding PUSCH in a same subframe.

As mentioned in the foregoing description, $n_{cs,\lambda}$ value of a demodulation reference signal, which is inserted into a subframe, can be generated using a scheme identical to a legacy scheme. In particular, according to the scheme proposed by the present invention, since two demodulation reference signals can be inserted into a single slot, the slot index ($n_s$) is used to determine a $n_{PN}(n_s)$ value in the aforementioned Formula 30. Consequently, $n_{PN}(n_s)$ the values of at least two demodulation reference signals may be identical to each other. By doing so, the $n_{cs,\lambda}$ value may also be identical to each other.

On the contrary, in order to differently determine all of the $n_{cs,\lambda}$ values of the demodulation reference signal inserted into a single subframe, Formula 32 can be used instead of the aforementioned Formula 30.

$$n_{PN}(n_{DMRS\_index}) = \Sigma_{i=0}^{7} c(8N_{symb}^{UL} \cdot n_{DMRS\_index} + i) \cdot 2^i \quad \text{[Formula 32]}$$

According to the Formula 32, since an index ($n_{DMRS\_index}$) of a demodulation reference signal is used instead of an index ($n_s$) of a slot, all of the $n_{cs,\lambda}$ values inserted into a single subframe can be differently configured. In this case, all of subframe indexes may have a value different from each other and it is sufficient for a subframe index if it is a value capable of distinguishing each of demodulation reference signals from each other. As an example of the subframe index, it may have one of 0, 1, and 2 according to each of the demodulation reference signals.

And, the index of the demodulation reference signal may have a value different from each other according to each subframe. As an example, the index ($n_{DMRS\_index}$) of the demodulation reference signal can be determined as $3 \times n_{subframe} \times \text{DMRS\_index}$. In this case, $n_{subframe}$ indicates an index of a subframe, DMRS_index means an index of a demodulation reference signal inserted into a single subframe and may have one of 0, 1, and 2. In this case, the constant number 3 used for calculating the index of the demodulation reference signal is just an example only. A different constant number (e.g., 1 and the like) can be used as well. As mentioned in the foregoing description, a cyclic shift can be determined by the aforementioned Formula 28 and 29 according to each demodulation reference signal using values determined by Formula 32 according to the demodulation reference signal.

2. 2. 2. Orthogonal Cover Code (OCC)

A UE can use a method explained in the following description to determine an OCC ([$w^\lambda(0)$ $w^\lambda(1)$ $w^\lambda(2)$]) value. The UE can use at least one of the methods explained in the following description to generate a demodulation reference signal.

And, a proposed OCC Table is just an example. In configuring the OCC Table, a different orthogonal code can be used. In this case, at least two multiplexing can be performed and the OCC Table can be configured using an orthogonal code including a constant envelop.

2. 2. 2. 1. Maintaining Orthogonality

In order to maintain orthogonality of OCCs, an OCC Table can be configured in a manner of variously combining [1 1 1], [1 $e^{j2\pi/3}$ $e^{j4\pi/3}$], [1 $e^{j4\pi/3}$ $e^{j2\pi/3}$] with each other. In this case, each cyclic shift field within uplink-related DCI format and a [$w^\lambda(0)$ $w^\lambda(1)$ $w^\lambda(2)$] value according to a layer (λ) can use the aforementioned Table 21. Or, the OCC Table can be configured using a different combination of the [1 1 1], [1 $e^{j2\pi/3}$ $e^{j4\pi/3}$], [1 $e^{j4\pi/3}$ $e^{j2\pi/3}$]. In particular, based on the aforementioned Table 21, OCCs can be represented in a cyclic shift field within the uplink-related DCI format and the layer (λ) in a manner of being switched (or converted) to each other. For instance, a row indicating an OCC value according to each cyclic shift field may be switched or a column indicating an OCC value according to each layer (λ) may be switched. And, the row indicating an OCC value according to each cyclic shift field and two columns indicating an OCC value according to each layer (λ) can be switched together. In this case, switching of each row and/or column can be performed in a manner of switching prescribed two rows and/or columns with each other. Or, a plurality of rows and/or columns can be switched with each other in a manner of making a pair with each other. And, a position of a plurality of rows and/or columns may be cyclically or randomly modified without making a pair. While the OCC Table is configured, a sign of all OCCs can be represented by a form of being multiplied by −1. This does not affect the orthogonality of the OCC.

When the OCCs are switched from each other, the OCC Table can be represented as Table 23 as follows.

Table 23 exemplifies the OCC Table for maintaining orthogonality of the OCCs.

TABLE 23

| Cyclic Shift Field in uplink-related DCI format [3] | $n_{DMRS,\lambda}^{(2)}$ | | | | [$w^\lambda(0)$ $w^\lambda(1)$ $w^\lambda(2)$] | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1 1] | [1 1 1] | [1 1 1] | [1 1 1] |
| 001 | 6 | 0 | 9 | 3 | [1 $e^{j2\pi3}$ $e^{j4\pi3}$] | [1 $e^{j2\pi3}$ $e^{j4\pi3}$] | [1 $e^{j4\pi3}$ $e^{j2\pi3}$] | [1 $e^{j4\pi3}$ $e^{j2\pi3}$] |
| 010 | 3 | 9 | 6 | 0 | [1 $e^{j2\pi3}$ $e^{j4\pi3}$] | [1 $e^{j2\pi3}$ $e^{j4\pi3}$] | [1 $e^{j4\pi3}$ $e^{j2\pi3}$] | [1 $e^{j4\pi3}$ $e^{j2\pi3}$] |
| 011 | 4 | 10 | 7 | 1 | [1 1 1] | [1 1 1] | [1 $e^{j2\pi3}$ $e^{j4\pi3}$] | [1 $e^{j4\pi3}$ $e^{j2\pi3}$] |

TABLE 23-continued

| Cyclic Shift Field in uplink-related DCI format [3] | $n_{DMRS,\lambda}^{(2)}$ | | | | [$w^\lambda(0)$ $w^\lambda(1)$ $w^\lambda(2)$] | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 100 | 2 | 8 | 5 | 11 | [1 1 1] | [1 1 1] | [1 $e^{j2\pi3}$ $e^{j4\pi3}$] | [1 $e^{j4\pi3}$ $e^{j2\pi3}$] |
| 101 | 8 | 2 | 11 | 5 | [1 $e^{j2\pi3}$ $e^{j4\pi3}$] | [1 $e^{j4\pi3}$ $e^{j2\pi3}$] | [1 1 1] | [1 1 1] |
| 110 | 10 | 4 | 1 | 7 | [1 $e^{j2\pi3}$ $e^{j4\pi3}$] | [1 $e^{j4\pi3}$ $e^{j2\pi3}$] | [1 1 1] | [1 1 1] |
| 111 | 9 | 3 | 0 | 6 | [1 1 1] | [1 1 1] | [1 1 1] | [1 1 1] |

Referring to Table 23, it indicates an example of a cyclic shift field within the uplink-related DCI format where OCCs corresponding to 000 to 011 and OCCs corresponding to 100 to 111 are switched with each other based on the aforementioned Table 21.

2. 2. 2. 2. Maintaining Partial Orthogonality

In order to maintain partial orthogonality, an OCC ([$w^\lambda(0)$ $w^\lambda(1)$ $w^\lambda(2)$]) can be configured as Table 24 as follows.

Table 24 exemplifies an OCC Table to maintain partial orthogonality.

TABLE 24

| Cyclic Shift Field in uplink-related DCI format [3] | $n_{DMRS,\lambda}^{(2)}$ | | | | [$w^\lambda(0)$ $w^\lambda(1)$ $w^\lambda(2)$] | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1 1] | [1 1 1] | [1 −1 1] | [1 −1 1] |
| 001 | 6 | 0 | 9 | 3 | [1 −1 1] | [1 −1 1] | [1 1 1] | [1 1 1] |
| 010 | 3 | 9 | 6 | 0 | [1 −1 1] | [1 −1 1] | [1 1 1] | [1 1 1] |
| 011 | 4 | 10 | 7 | 1 | [1 1 1] | [1 1 1] | [1 1 1] | [1 1 1] |
| 100 | 2 | 8 | 5 | 11 | [1 1 1] | [1 1 1] | [1 1 1] | [1 1 1] |
| 101 | 8 | 2 | 11 | 5 | [1 −1 1] | [1 −1 1] | [1 −1 1] | [1 −1 1] |
| 110 | 10 | 4 | 1 | 7 | [1 −1 1] | [1 −1 1] | [1 −1 1] | [1 −1 1] |
| 111 | 9 | 3 | 0 | 6 | [1 1 1] | [1 1 1] | [1 −1 1] | [1 −1 1] |

As shown in Table 24, when an OCC Table is configured according to a cyclic shift field within an uplink-related DCI format and a layer ($\lambda$), an OCC for a first demodulation reference signal and an OCC for a second demodulation reference signal can maintain orthogonality with a first OCC and a second OCC according to a cyclic shift field within a different uplink-related DCI format or a different layer ($\lambda$). In particular, [1 1] and [1 −1] are orthogonal to each other. And, the OCC for the second demodulation reference signal and an OCC for a third demodulation reference signal can maintain orthogonality with the second OCC and a third OCC according to a cyclic shift field within a different uplink-related DCI format or a different layer ($\lambda$). In particular, as mentioned in the foregoing description, [1 1] and [1 −1] are orthogonal to each other. Hence, when OCCs maintain partial orthogonality, a base station receiving a demodulation reference signal can perform a channel estimation using two demodulation reference signals together. For instance, the base station can use both the first and second demodulation reference signal together and can use both the second and third demodulation reference signal together.

In particular, based on the aforementioned Table 24, OCCs can be represented in a cyclic shift field within the uplink-related DCI format and the layer ($\lambda$) in a manner of being switched (or converted) to each other. For instance, a row indicating an OCC value according to each cyclic shift field may be switched or a column indicating an OCC value according to each layer ($\lambda$) may be switched. And, the row indicating an OCC value according to each cyclic shift field and two columns indicating an OCC value according to each layer ($\lambda$) can be switched together. In this case, switching of each row and/or column can be performed in a manner of switching prescribed two rows and/or columns with each other. Or, a plurality of rows and/or columns can be switched with each other in a manner of making a pair with each other. And, a position of a plurality of rows and/or columns may be cyclically or randomly modified without making a pair. While the OCC Table is configured, a sign of all OCCs can be represented by a form of being multiplied by −1. This does not affect the orthogonality of the OCC.

When the OCCs are switched from each other, the OCC Table can be represented as Table 25 as follows.

Table 25 indicates a different example of the OCC Table to maintain partial orthogonality of the OCC.

TABLE 25

| Cyclic Shift Field in uplink-related DCI format [3] | $n_{DMRS,\lambda}^{(2)}$ | | | | [$w^\lambda(0)$ $w^\lambda(1)$ $w^\lambda(2)$] | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1 1] | [1 1 1] | [1 1 1] | [1 1 1] |
| 001 | 6 | 0 | 9 | 3 | [1 −1 1] | [1 −1 1] | [1 −1 1] | [1 −1 1] |
| 010 | 3 | 9 | 6 | 0 | [1 −1 1] | [1 −1 1] | [1 −1 1] | [1 −1 1] |
| 011 | 4 | 10 | 7 | 1 | [1 −1 1] | [1 −1 1] | [1 1 1] | [1 1 1] |

TABLE 25-continued

| Cyclic Shift Field in uplink-related DCI format [3] | $n_{DMRS,\lambda}^{(2)}$ | | | | [$w^\lambda(0)\ w^\lambda(1)\ w^\lambda(2)$] | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 100 | 2 | 8 | 5 | 11 | [1 −1 1] | [1 −1 1] | [1 1 1] | [1 1 1] |
| 101 | 8 | 2 | 11 | 5 | [1 1 1] | [1 1 1] | [1 −1 1] | [1 −1 1] |
| 110 | 10 | 4 | 1 | 7 | [1 1 1] | [1 1 1] | [1 −1 1] | [1 −1 1] |
| 111 | 9 | 3 | 0 | 6 | [1 1 1] | [1 1 1] | [1 1 1] | [1 1 1] |

Referring to Table 25, it indicates an example of a cyclic shift field within the uplink-related DCI format where OCCs corresponding to 000 to 011 and OCCs corresponding to 100 to 111 are switched with each other, OCCs corresponding to a layer 0 and OCCs corresponding to a layer 1 are switched with each other, and OCCs corresponding to a layer 2 and OCCs corresponding to a layer 3 are switched with each other based on the aforementioned Table 24.

2. 2. 2. 3. Maintaining Backward Compatibility with Legacy System

An OCC ([$w^\lambda(0)\ w^\lambda(1)\ w^\lambda(2)$]) to maintain backward compatibility with a legacy system can be configured as Table 26 as follows.

Table 26 exemplifies an OCC Table to maintain backward compatibility with a legacy system.

TABLE 26

| Cyclic Shift Field in uplink-related DCI format [3] | $n_{DMRS,\lambda}^{(2)}$ | | | | [$w^\lambda(0)\ w^\lambda(1)\ w^\lambda(2)$] | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1 1] | [1 1 1] | [1 1 −1] | [1 1 −1] |
| 001 | 6 | 0 | 9 | 3 | [1 1 −1] | [1 1 −1] | [1 1 1] | [1 1 1] |
| 010 | 3 | 9 | 6 | 0 | [1 1 −1] | [1 1 −1] | [1 1 1] | [1 1 1] |
| 011 | 4 | 10 | 7 | 1 | [1 1 1] | [1 1 1] | [1 1 1] | [1 1 1] |
| 100 | 2 | 8 | 5 | 11 | [1 1 1] | [1 1 1] | [1 1 1] | [1 1 1] |
| 101 | 8 | 2 | 11 | 5 | [1 1 −1] | [1 1 −1] | [1 1 −1] | [1 1 −1] |
| 110 | 10 | 4 | 1 | 7 | [1 1 1] | [1 1 −1] | [1 1 −1] | [1 1 −1] |
| 111 | 9 | 3 | 0 | 6 | [1 1 1] | [1 1 1] | [1 1 −1] | [1 1 −1] |

Table 26 indicates an example that an orthogonal cover code (OCC=$w^\lambda(1)$) for an additionally inserted demodulation reference signal is configured by +1. Unlike Table 26, an OCC Table can also be configured by setting the OCC $w^\lambda(1)$ to −1.

In particular, based on the aforementioned Table 26, OCCs can be represented in a cyclic shift field within the uplink-related DCI format and the layer ($\lambda$) in a manner of being switched (or converted) to each other. For instance, a row indicating an OCC value according to each cyclic shift field may be switched or a column indicating an OCC value according to each layer ($\lambda$) may be switched. And, the row indicating an OCC value according to each cyclic shift field and two columns indicating an OCC value according to each layer ($\lambda$) can be switched together. In this case, switching of each row and/or column can be performed in a manner of switching prescribed two rows and/or columns with each other. Or, a plurality of rows and/or columns can be switched with each other in a manner of making a pair with each other. And, a position of a plurality of rows and/or columns may be cyclically or randomly modified without making a pair. While the OCC Table is configured, a sign of all OCCs can be represented by a form of being multiplied by −1. This does not affect the orthogonality of the OCC.

2. 2. 2. 4. Case of Limiting the Number of Layers

Since a channel state is not stable when a UE moves fast, uplink MIMO may not be configured in terms of a rank adaptation. For instance, two or less (or 1) layers can be used. In this case, an OCC Table can be represented by a case that a layer ($\lambda$) has values of 0 and 1 (or 0) only.

The OCC Table can be configured as Table 27 based on the aforementioned Table 24.

Table 27 exemplifies the OCC Table when uplink MIMO is not configured.

TABLE 27

| Cyclic Shift Field in uplink-related DCI format [3] | $n_{DMRS,\lambda}^{(2)}$ | | [$w^\lambda(0)\ w^\lambda(1)\ w^\lambda(2)$] | |
|---|---|---|---|---|
| | $\lambda=0$ | $\lambda=1$ | $\lambda=0$ | $\lambda=1$ |
| 000 | 0 | 6 | [1 1 1] | [1 1 1] |
| 001 | 6 | 0 | [1 −1 1] | [1 −1 1] |
| 010 | 3 | 9 | [1 −1 1] | [1 −1 1] |
| 011 | 4 | 10 | [1 1 1] | [1 1 1] |
| 100 | 2 | 8 | [1 1 1] | [1 1 1] |
| 101 | 8 | 2 | [1 −1 1] | [1 −1 1] |
| 110 | 10 | 4 | [1 −1 1] | [1 −1 1] |
| 111 | 9 | 3 | [1 1 1] | [1 1 1] |

In particular, based on the aforementioned Table 27, OCCs can be represented in a cyclic shift field within the uplink-related DCI format and the layer ($\lambda$) in a manner of being switched (or converted) to each other. For instance, a row indicating an OCC value according to each cyclic shift field may be switched or a column indicating an OCC value according to each layer ($\lambda$) may be switched. And, the row indicating an OCC value according to each cyclic shift field and two columns indicating an OCC value according to each layer ($\lambda$) can be switched together. In this case, switching of each row and/or column can be performed in a manner of switching prescribed two rows and/or columns with each other. Or, a plurality of rows and/or columns can be switched with each other in a manner of making a pair with each other. And, a position of a plurality of rows and/or columns may be cyclically or randomly modified without making a pair. While the OCC Table is configured, a sign of all OCCs can be represented by a form of being multiplied by −1. This does not affect the orthogonality of the OCC.

3. Device to which the Present Invention is Applicable

Figure 15:
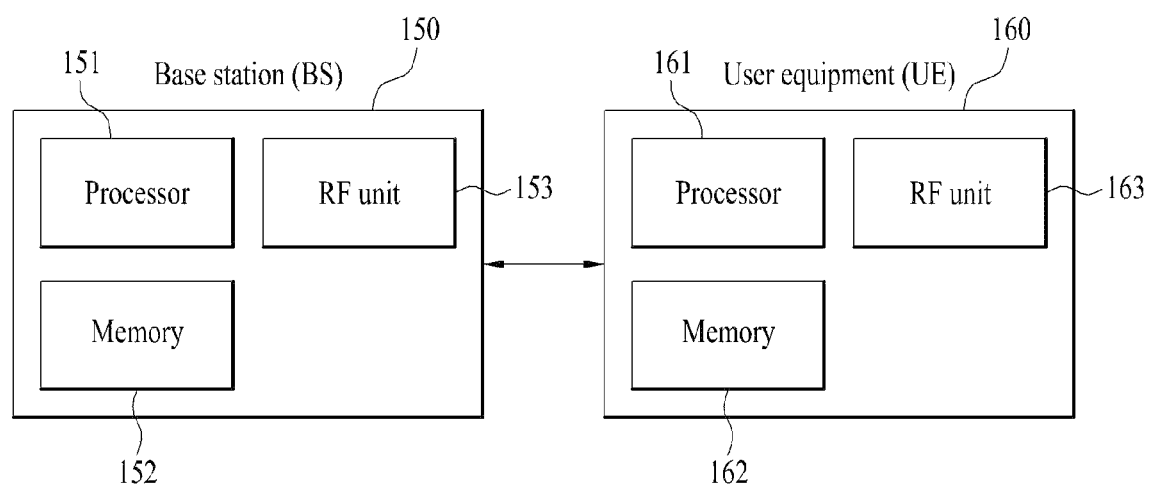
FIG. 15 is a block diagram for a configuration of a wireless communication device according to one embodiment of the present invention.

FIG. 15 is a block diagram for a configuration of a wireless communication device according to one embodiment of the present invention.

Referring to FIG. 15, a wireless communication system includes a base station 150 and a plurality of user equipments 160 positioned within a region of the base station 150.

The base station 150 includes a processor 151, a memory 152, and a RF (radio frequency) unit 153. The processor 151 is configured to implement a proposed function, a procedure and/or a method. Layers of a radio interface protocol can be implemented by the processor 151. The memory 152 is connected with the processor 151 and stores various informations to drive the processor 151. The RF unit 153 is connected with the processor 151 and is configured to transmit/receive a radio signal.

The user equipment 160 includes a processor 161, a memory 162, and a RF (radio frequency) unit 163. The processor 161 is configured to implement a proposed function, a procedure and/or a method. Layers of a radio interface protocol can be implemented by the processor 161. The memory 162 is connected with the processor 161 and stores various informations to drive the processor 161. The RF unit 163 is connected with the processor 161 and is configured to transmit/receive a radio signal.

The memory 152/162 can be positioned at an inside or an outside of the processor 151/161 and can be connected to the processor 151/161 with a well-known means. And, the base station 150 and/or the user equipment 160 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Although a method of transmitting/receiving a data in a wireless access system according to the present invention and apparatus therefor are described with reference to examples applied to 3GPP LTE system, it may be applicable to various kinds of wireless communication systems as well as the 3GPP LTE system.

What is claimed is:

1. A method for transmitting an uplink reference signal in a wireless access system, the method comprising:
    generating a plurality of uplink reference signal sequences;
    mapping respectively the plurality of uplink reference signal sequences to 3 orthogonal frequency division multiplexing (OFDM) symbols within one subframe; and
    transmitting the plurality of mapped uplink reference signal sequences to a base station,
    wherein the plurality of uplink reference signal sequences are generated by applying an orthogonal cover code having a length of 3 and respective cyclic shift values, and
    wherein a cyclic shift value for an uplink reference signal sequence is determined based on an index of the uplink reference signal sequence and an index of a subframe in which the uplink reference signal sequence is transmitted.

2. The method of claim 1, wherein the cyclic shift values for the plurality of uplink reference signal sequences are different from each other.

3. The method of claim 1, wherein a part of the orthogonal cover code has orthogonality in accordance with a cyclic shift field within downlink control information or a layer.

4. The method of claim 1, wherein a part of the orthogonal cover code for an uplink reference signal sequence mapped to the second OFDM symbol of the three OFDM symbols has a fixed value irrespective of a cyclic shift field within downlink control information or a layer.

5. The method of claim 1, wherein a maximum distance between the three OFDM symbols corresponds to 3 or 4 OFDM symbols.

6. A user equipment transmitting an uplink reference signal in a wireless access system, comprising:
    a radio frequency (RF) unit configured to transceive a radio signal; and a processor configured to generate a plurality of uplink reference signal sequences, map respectively the plurality of uplink reference signal sequences to 3 orthogonal frequency division multiplexing (OFDM) symbols within one subframe, and transmit the plurality of mapped uplink reference signal sequences to a base station, wherein the plurality of uplink reference signal sequences are generated by applying an orthogonal cover code having a length of 3 and respective cyclic shift values, and wherein a cyclic shift value for an uplink reference signal sequence is determined based on an index of the uplink reference signal sequence and an index of a subframe in which the uplink reference signal sequence is transmitted.

7. The user equipment of claim 6, wherein the cyclic shift values for the plurality of uplink reference signal sequences are different from each other.

8. The user equipment of claim 6, wherein a part of the orthogonal cover code has orthogonality in accordance with a cyclic shift field within downlink control information or a layer.

9. The user equipment of claim 6, wherein a part of the orthogonal cover code for an uplink reference signal sequence mapped to the second OFDM symbol of the three OFDM symbols has a fixed value irrespective of a cyclic shift field within downlink control information or a layer.

10. The user equipment of claim 6, wherein a maximum distance between the three OFDM symbols corresponds to 3 or 4 OFDM symbols.

11. The method of claim 1, wherein the plurality of uplink reference signal sequences are used for demodulation of an uplink signal.

12. The user equipment of claim 6, wherein the plurality of uplink reference signal sequences are used for demodulation of an uplink signal.

* * * * *